US011511465B2

(12) United States Patent
Sitnik

(10) Patent No.: US 11,511,465 B2
(45) Date of Patent: Nov. 29, 2022

(54) ROSIN PRESS SYSTEM

(71) Applicant: Spencer Sitnik, Downey, CA (US)

(72) Inventor: Spencer Sitnik, Downey, CA (US)

( * ) Notice: Subject to any disclaimer, the term of this patent is extended or adjusted under 35 U.S.C. 154(b) by 170 days.

(21) Appl. No.: 16/816,700

(22) Filed: Mar. 12, 2020

(65) Prior Publication Data
US 2020/0223111 A1 Jul. 16, 2020

Related U.S. Application Data

(63) Continuation-in-part of application No. 15/917,214, filed on Mar. 9, 2018, now Pat. No. 11,040,510.

(60) Provisional application No. 62/945,511, filed on Dec. 9, 2019, provisional application No. 62/828,701, filed on Apr. 3, 2019, provisional application No. 62/819,098, filed on Mar. 15, 2019, provisional application No. 62/818,097, filed on Mar. 13, 2019, provisional application No. 62/528,962, filed on Jul.
(Continued)

(51) Int. Cl.
*B30B 15/06* (2006.01)
*C11B 1/08* (2006.01)
*B30B 9/04* (2006.01)
*B30B 15/34* (2006.01)
*B29C 43/36* (2006.01)
*B29C 43/00* (2006.01)

(52) U.S. Cl.
CPC ............ *B29C 43/36* (2013.01); *B29C 43/003* (2013.01); *B30B 9/04* (2013.01); *B30B 15/064* (2013.01); *C11B 1/08* (2013.01); *B29C 2043/366* (2013.01); *B29K 2093/00* (2013.01); *B30B 15/34* (2013.01)

(58) Field of Classification Search
CPC ..... B30B 15/06; B30B 15/062; B30B 15/064; B30B 15/065; B30B 9/04; B30B 15/34; B30B 9/06; A47J 19/023
See application file for complete search history.

(56) References Cited

U.S. PATENT DOCUMENTS 5,780,139 A * 7/1998 Carter ................... B30B 15/065
72/481.1
7,832,448 B2 11/2010 Backhaus
(Continued)

FOREIGN PATENT DOCUMENTS

CN 206 201 525 5/2017
CN 208 263 505 12/2018
(Continued)

OTHER PUBLICATIONS

International Preliminary Report on Patentability of the International Searching Authority, PCT/US2020/022316, dated Aug. 25, 2021.
(Continued)

*Primary Examiner* — Jessica Cahill
*Assistant Examiner* — Jared O Brown
(74) *Attorney, Agent, or Firm* — Risso I.P.

(57) ABSTRACT

Described is a rosin press system for extracting rosin (oil) from plant material. The rosin press system includes a male plate with a male protrusion and a female plate formed to matingly receive the male protrusion. The plates can be heated such that when plant material is pressed between the plates, rosin is pressed from the plant material and allowed to drain from a drain hole positioned at the middle of the female plate.

18 Claims, 20 Drawing Sheets

Related U.S. Application Data

5, 2017, provisional application No. 62/469,688, filed on Mar. 10, 2017.

(56) References Cited

U.S. PATENT DOCUMENTS

| | | | |
|---|---|---|---|
| 10,196,582 B1 * | 2/2019 | Black | B30B 15/34 |
| 10,745,648 B1 * | 8/2020 | Lewis | B30B 15/064 |
| 2018/0178473 A1 * | 6/2018 | Perez | B30B 15/34 |
| 2018/0257326 A1 | 9/2018 | Sitnik | |

FOREIGN PATENT DOCUMENTS

| | | | | |
|---|---|---|---|---|
| DE | 856928 C | * | 11/1952 | B30B 15/064 |
| FR | 1109243 | * | 1/1956 | B30B 9/06 |
| FR | 1167211 | * | 11/1958 | B30B 9/06 |
| FR | 2638625 A1 | * | 5/1990 | B30B 15/062 |
| KR | 100 712 932 | | 5/2007 | |
| WO | WO-2006103900 A1 | * | 10/2006 | B30B 9/06 |

OTHER PUBLICATIONS

International Search Report of the International Searching Authority, PCT/US2020/022316, dated Jun. 25, 2020.

* cited by examiner

100

ROSIN PRESS SYSTEM

CROSS-REFERENCE TO RELATED APPLICATIONS

The present application is a Continuation-in-Part application of U.S. Ser. No. 15/917,214, filed on Mar. 9, 2018, which is a non-provisional application of U.S. Provisional Application No. 62/469,688, filed on Mar. 10, 2017, and U.S. Provisional Application No. 62/528,962, filed on Jul. 5, 2017, the entirety of which are incorporated herein by reference.

The present application is ALSO a non-provisional application of U.S. Provisional Application No. 62/818,097 filed on Mach 13, 2019, the entirety of which is incorporated herein by reference.

The present application is ALSO a non-provisional application of U.S. Provisional Application No. 62/819,098 filed on Mar. 15, 2019, the entirety of which is incorporated herein by reference.

The present application is ALSO a non-provisional application of U.S. Provisional Application No. 62/828,701 filed on Apr. 3, 2019, the entirety of which is incorporated herein by reference.

The present application is ALSO a non-provisional application of U.S. Provisional Application No. 62/945,511 filed on Dec. 9, 2019, the entirety of which is incorporated herein by reference.

BACKGROUND OF THE INVENTION

(1) Field of Invention

The present invention relates to a plant material/oil extractor and, more particularly, to a rosin press for extracting rosin (oil) from plant material.

(2) Description of Related Art

Rosin is an extraction process that uses both heat and pressure to squeeze an extract (e.g., oil, resin, or rosin) from plant material. The extraction process typically uses a rosin press that includes flat heat plates that are pressed together to squeeze/press the extract from the plant material. A problem with existing systems is that they are limited in their footprint in which they can extract rosin. In other words, the area of the plates limits the size of the heat plates. Further, the very nature of existing heat plates makes it difficult to accumulate or otherwise collect the extracted rosin.

Thus, a continuing need exists for a rosin press that improves upon the deficiencies of the prior art and expands the previously limited size of the heated plates.

SUMMARY OF INVENTION

The present invention relates to a plant material/oil extractor and, more particularly, to a rosin press. The rosin press include a frame assembly with a pressing mechanism (e.g., hydraulic press, etc.). Also included are both a male plate (e.g., a plate with a male protrusion) and a female plate with a recess (e.g., a plate having a recess or hole to accommodate the male protrusion) formed to matingly receive the male plate.

In another aspect, a channel is formed in the male plate surrounding the male protrusion.

In yet another aspect, each of the male plate and female plate are heated with heating elements.

Further, each of the male plate and female plate are split into two parts, with grooves formed therebetween for placement of the heating elements such that the two parts of each of the male plate and female plate sandwich the heating elements within each of the male plate and female plate.

Additionally, each of the male plate and female plate include eight heating elements positioned around the male protrusion and recess, respectively.

In yet another access, the recess is a centrally positioned drain hole.

In another aspect, the male projection is a trapezoidal-shaped pyramid.

In yet another aspect, a pressure distributor is connected between the pressing mechanism and male plate.

In another aspect, a pressure plate is connected between the pressure distributor and male plate, such that pressure from the pressing mechanism is distributed to the pressure plate and, thereafter, to the male plate.

Further, the frame assembly includes a frame plate suspended above a collection area, and further comprises a heat block attached with the frame plate. Additionally, the female plate is attached with the heat block to reduce heat transfer between the female plate to the frame assembly.

In another aspect, parchment paper is included. The parchment paper is formed to include a parchment tip and accommodate a mesh filter bag.

In another aspect, a mesh filter bag having a truncated cone shape is included.

Additionally, each parchment paper is sized and shaped such that four parchment papers can be positioned on the female plate to surround the recess, with the parchment tips being directed into the recess.

Finally, as can be appreciated by one in the art, the present invention also comprises a method for forming and using the rosin press described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a plant material/oil extractor and, more particularly, to a rosin press for extracting rosin (oil) from plant material. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction.

Instead, they are used to reflect relative locations and/or directions between various portions of an object.

(1) Description

Figure 1:
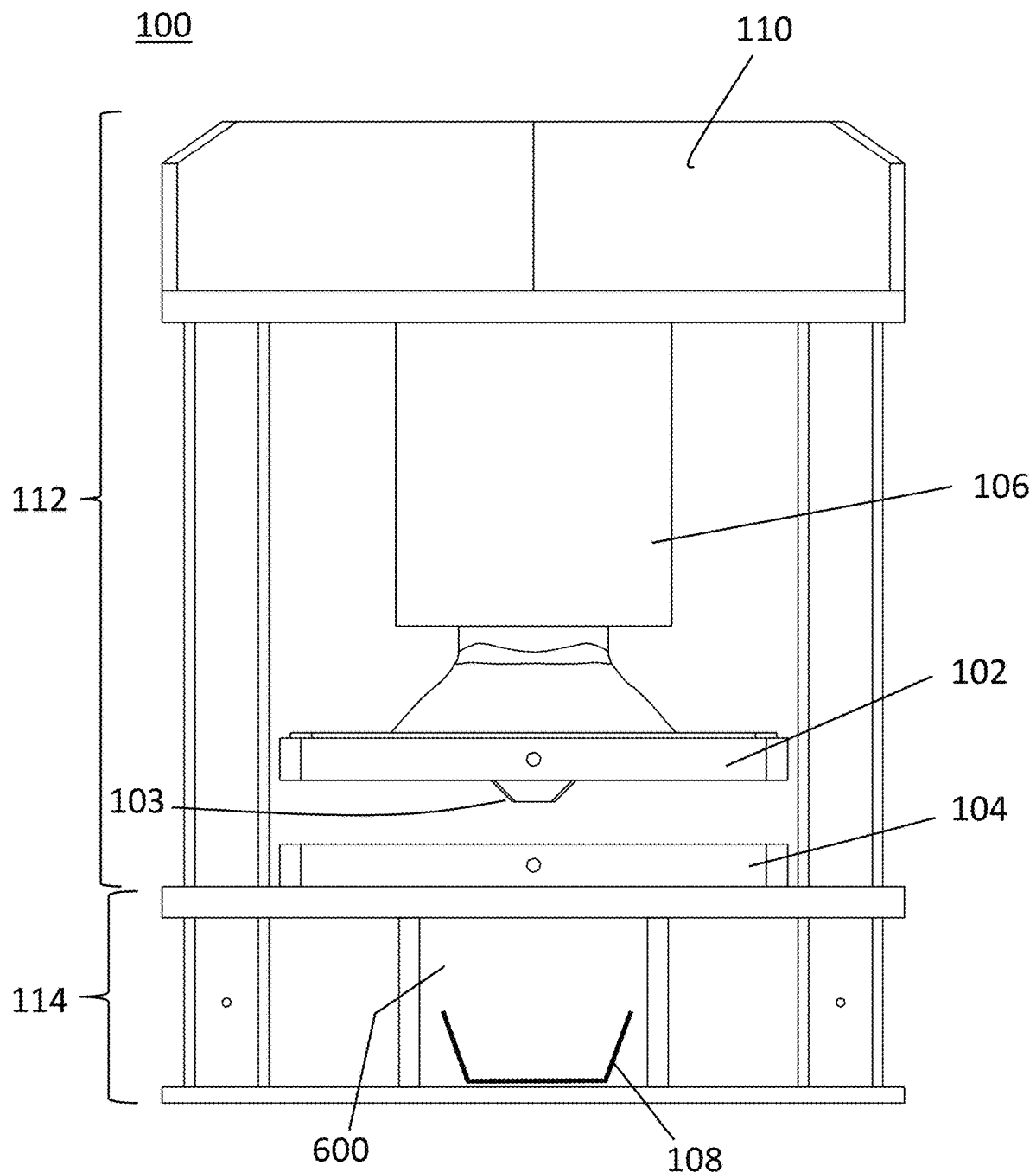
FIG. 1 is a side-view illustration of a rosin press according to various embodiments of the present invention.

As noted above and as shown in the figures, this disclosure is directed to a rosin press. As shown in FIG. 1, the rosin press 100 is an extraction device that uses heat and pressure to provide a precise pressure for pressing oils and/or rosin from plant materials. The plant material that may be used with the rosin press 100 is any desirable plant material from which rosin (oil) can be extracted through pressure and/or heat. Notably, the press 100 includes at least two plates, a male plate 102 and a female plate 104 (e.g., plastic plates or metal plates, such as aluminum, or other suitable materials). The male plate 102 includes male protrusion 103 that projects downwards and toward the female plate 104. Each of the plates 102 and 104 can be formed in any suitable shape to allow for mating engagement between the two plates and an ability to press the plant material therebetween. In other words, the female plate 104 is formed with a recess or hole (described in further detail below) to matingly receive the male protrusion 103 from the male plate 102 and direct pressed rosin, oils, extracts etc., through the female plate 104 and into a collection container 108 or tray there below.

Although not limited thereto, in various embodiments, the male plate 102 is suspended from a pressing mechanism 106 and positioned above the female plate 104. The pressing mechanism 106 is connected with a frame assembly 110 to securely affix the pressing mechanism 106 in place and align the male plate 102 with the female plate 104. The pressing mechanism 106 is any suitable mechanism or device that is selectively controllable to press the plates 102 and 104 against each wither with sufficient force to press extract from plant material. As a non-limiting example, the pressing mechanism 106 is a hydraulic cylinder with a 10,000 pounds per square inch (psi) pump to power a 100 ton or close to 200,000 pounds of force when fully extended, a screw or other mechanical advantage from a lever, etc., to press the male plate 102 down. The rosin press 100 is designed with adequate pressure per square inch of the surface area. For example, a 100 ton cylinder is used, yet 75 Tons or 145,000 lbs of force is used to disburse pressure between 135" square area of the heat plate. This is then converted to pounds per square inch of plant material or bag space after parchment paper inserts of 72" square. In this example, 145,000 lbs of pressure divided by 72" results in 2013 psi. Adequate pressure of approximately 2000 psi is important to assure oil is separated from plant material as fast as possible to preserve terpenes (taste) and quality (color).

The frame assembly 110 is formed in any suitable manner to provide the functions as described herein. For example, the frame assembly 100 includes a top part 112 to house the cylinder (i.e., pressing mechanism) and the plates 102 and 104, and a bottom part 114 which holds the electronics such as the controllers (e.g., proportional-integral-derivative controller (PID), wiring and power switches, addition to housing the oil catching area or catching opening (for the collection container 108). It should be noted that the electronics and controllers, switches, etc. can be housed at any desired location and are not necessarily housed within the bottom part 114. However, for convenience and compactness, the components are desirably housed in the bottom part 114.

Figure 2:
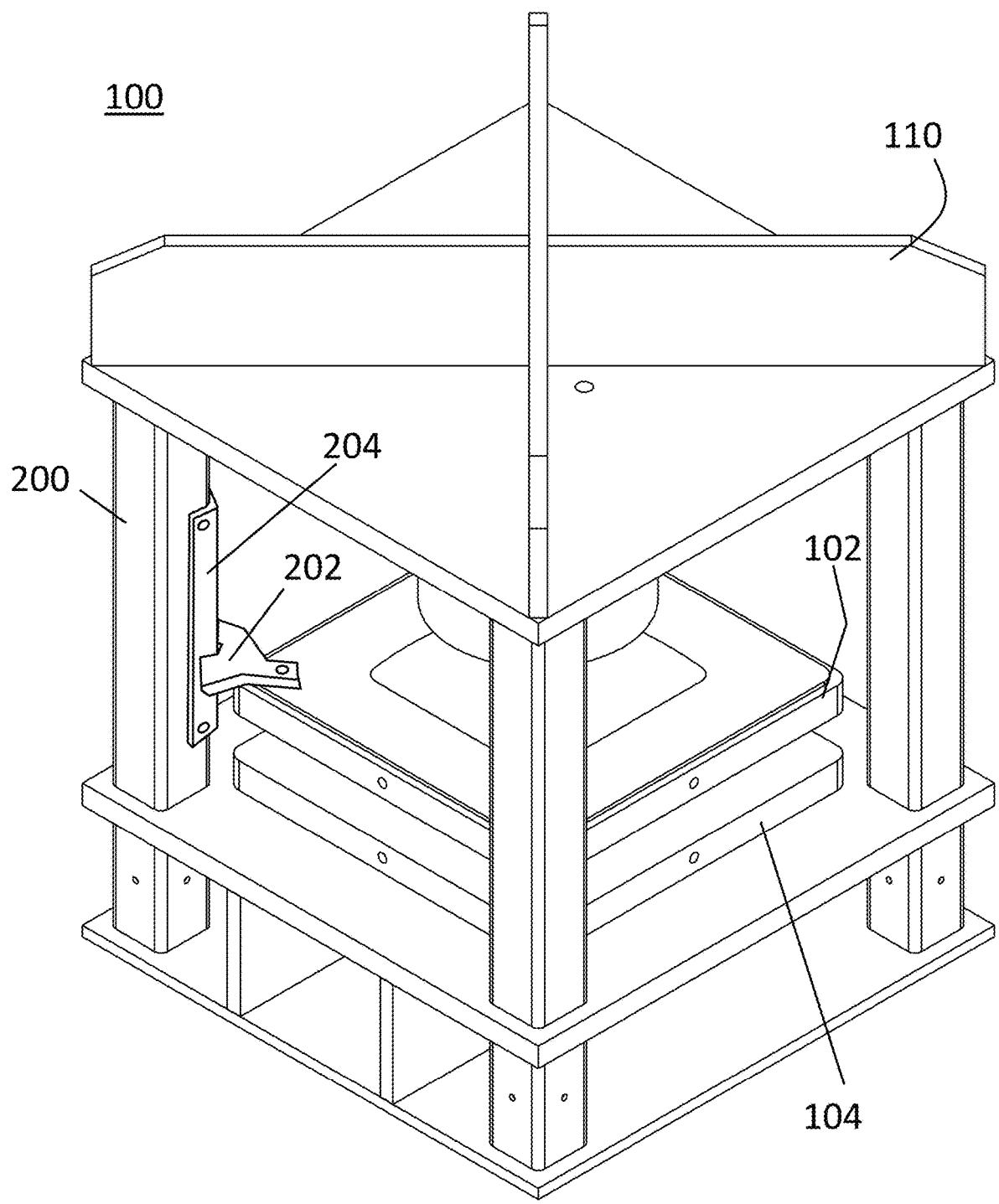
FIG. 2 is an elevated-view illustration of the rosin press according to various embodiments of the present invention.
Figure 3:
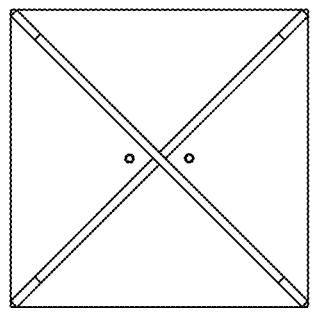
FIG. 3 is a top-view illustration of the rosin press according to various embodiments of the present invention.
Figure 4:
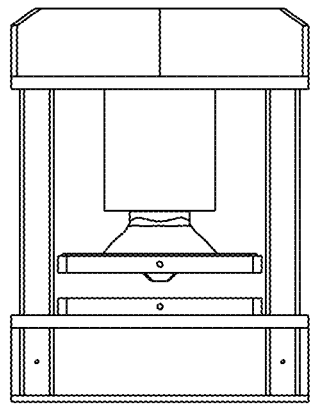
FIG. 4 is a front-view illustration of the rosin press according to various embodiments of the present invention.
Figure 5:
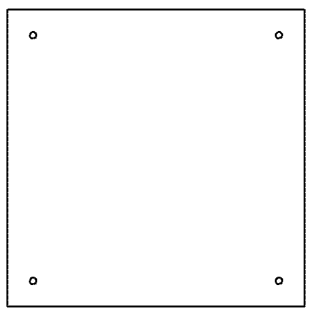
FIG. 5 is a bottom-view illustration of the rosin press according to various embodiments of the present invention.

For further understanding, FIGS. 2, 3, 4, and 5 provide elevated, top, front, and bottom views, respectively, of the rosin press 100. It should be noted that the top portion can be formed in any suitable manner so long as the male plate 102 is positioned or positionable such that it can be pressed against the female plate 104 As a non-limiting example and as shown in FIG. 2, the frame assembly 110 optionally includes one or more posts 200 that support the top portion. In one example embodiment, one of the posts operates as a guide rail to maintain alignment of the plates 102 and 104 and prevent the top plate 102 from spinning or rotating with the cylinder of the pressing mechanism. For example, in some aspects, a y-guide 202 is attached with the male plate 102 that wraps around and slides against a sheath 204 positioned against the post 200. The sheath 204 is any suitable material that allows for maintaining the position of the guide 202 while reducing friction. As a non-limiting example, the sheath 204 is made of Teflon.

Figure 6:
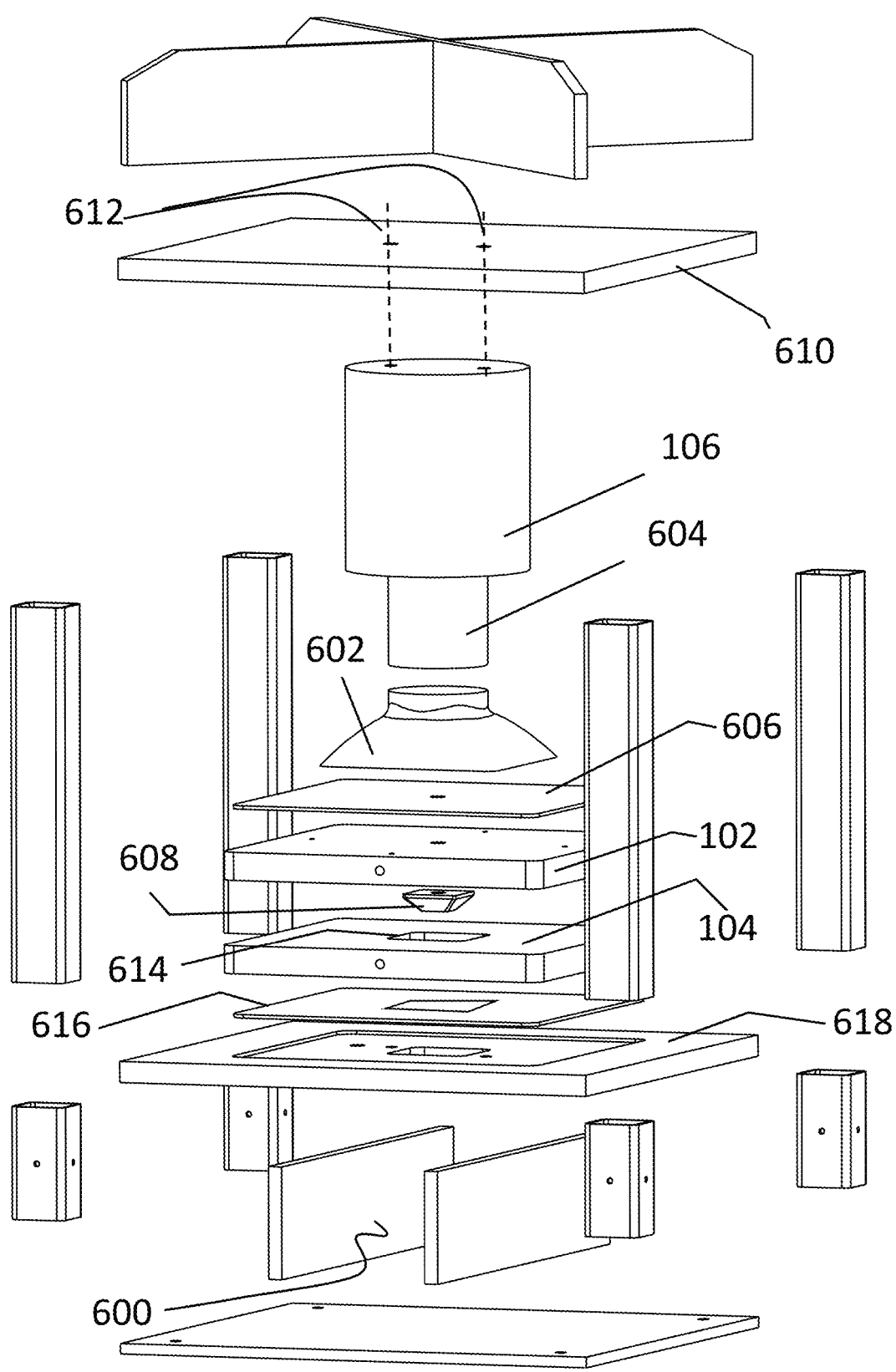
FIG. 6 is an exploded-view illustration of the rosin press according to various embodiments of the present invention.

For further understanding, FIG. 6 provides an exploded view illustration of the rosin press 100. It should be understood that although specific details are provided below, the invention is not intended to be limited thereto as it can be modified as desired so long as the male 102 and female plate 104 operate as described. Desirably, the frame assembly is constructed of all steel, welded together as one part. The frame assembly houses the pressing mechanism 106 (e.g., the cylinder) and is the frame work for the innovative "self-collecting" oil catching area 600 (i.e., where a collection tray can be placed) as the oil or rosin is pressed from the plant material and caused to drain through the female plate 104 and into the catching area 600. Wiring harness cutouts can be added prior to any welds. The pressing mechanism 106 (e.g., the hydraulic or pneumatic cylinder) is tightened to the frame (e.g., with two number 12 bolts). A benefit to self-collecting oil is that an operator can control the different stages of oil and quality of oil which changes with time under pressure and on great plates. Another benefit is the ability to place a digital scale to log results and automatically calculate return/yielding results. A camera can be installed to display the results of the press 100 on a screen and video log data.

A pressure distributor 602 is desirably included. The pressure distributor 602 (e.g., made of aluminum or other suitable material) is shaped to distribute the pressure from the pressing mechanism 106 to prevent the plates 102 and 104 from warping when pressed together. For example, the pressure distributor 602 is formed in a pyramid shape and recessed into a rod 604 of the pressing mechanism 106. A wide side of the pressure distributor 602 is attached (via screws, bolts, or via any other means) with a plate distributor 606. The plate distributor 606 is desirably recessed to receive the wide side of the pressure distributor 602; however, it can also be flat as depicted. The plate distributor 606 (e.g., made or steel or other suitable strong material) distributes pressure toward the edges of the male plate 102 so that the pressure applied to parchment paper between the plates 102 and 104 is evenly disbursed (e.g., to 0.500" inside of the edge of the male plate 102). The plate distributor 606 is recessed onto (or otherwise affixed with) the heating male plate 102. In some aspects, between the heated male plate 102 and plate distributor 606 is a recessed Phenolic Sheet insert which prevents heat transfer away from the male plate 102 and strengthens the aluminum heated male plate 102. Also depicted is the male protrusion 608 that projects from a bottom side of the male plate 102.

Figure 7:
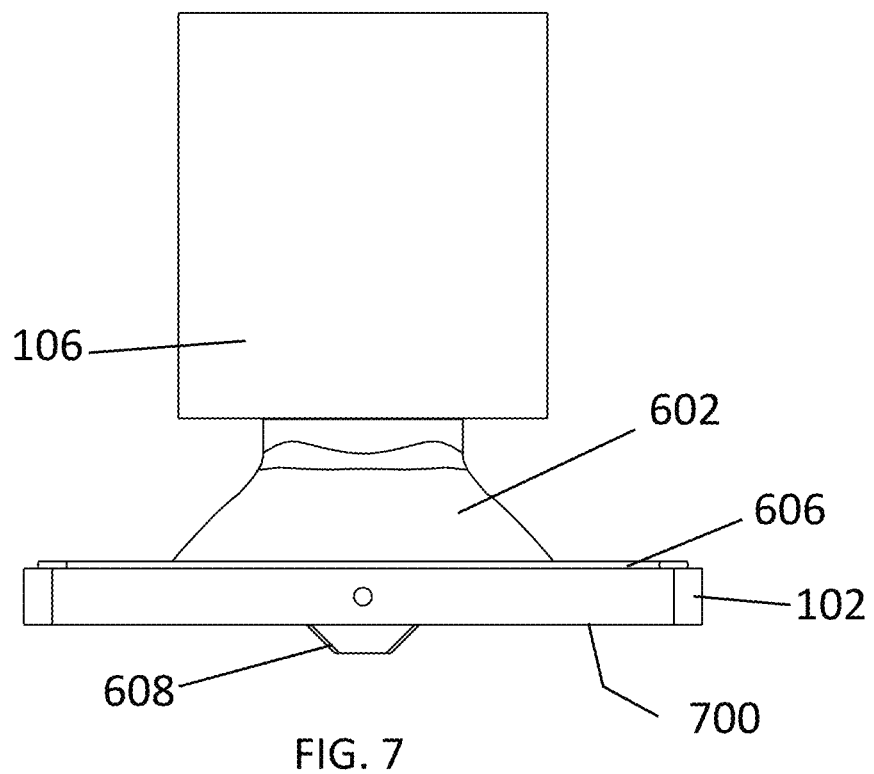
FIG. 7 is a side-view illustration of a pressure distributor, press mechanism, and male plate according to various embodiments of the present invention.
Figures 8, 9:
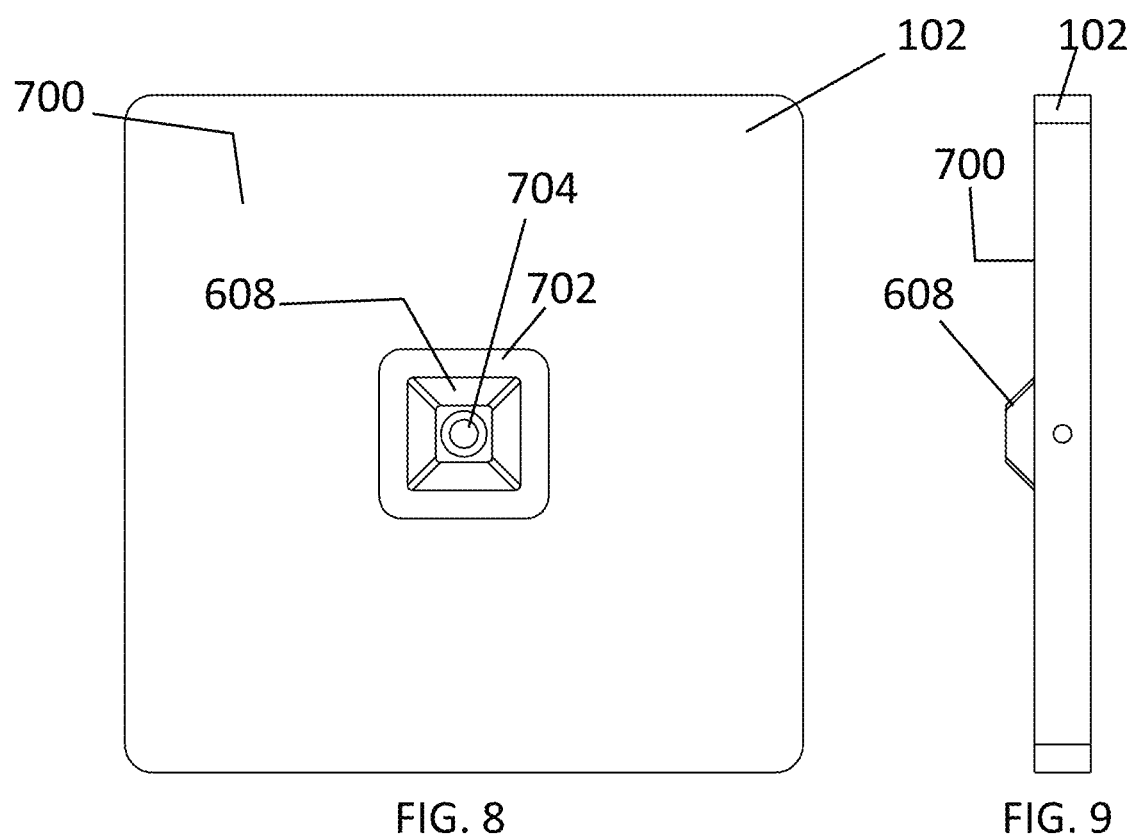
FIG. 8 is a bottom-view illustration of the male plate according to various embodiments of the present invention.
FIG. 9 is a side-view illustration of the male plate according to various embodiments of the present invention.

For further understanding and as shown in FIGS. 7, 8 and 9, the bottom side 700 of the male plate 102 includes the male protrusion 608. Also as depicted, a channel 702 is formed in the bottom side 700 around the male protrusion 608. The channel 702 is any suitable shape to assist in preventing pressed material from seeping or otherwise sliding toward the periphery of the male plate 102. As a non-liming example, the channel 702 is formed by a three-inch wide cutout on the bottom side 700 of the male plate 102, in which the male protrusion 608 is placed such that the channel 700 surrounds the male protrusion 608. Thus, in this aspect, the channel 700 is approximately one quarter inches deep and one half inch wide as it surrounds the male protrusion 608. The channel 702 is important to assist in providing space for the pressed material to seep to and then down through the bottom female plate. In another aspect, the channel is cut out of the bottom side 700 around the male protrusion 608.

The male protrusion 608 operates as a nipple pyramid that directs the parchment paper insert tip (approximately an inch) downward for a one-inch square pouring circumference if multiple bags (e.g., 4) are used. Desirably, the male protrusion 608 is formed in the shape of trapezoidal pyramid to accommodate and direct multiple parchment papers into the drain hole (as described in further detail below). In one aspect, the male protrusion 608 is positioned into the bottom side 700 of the male plate 102 in the center of the bottom plate center cutout (which forms the channel 702 around the male protrusion 608 when the male protrusion 608 is affixed within the center cutout).

The male protrusion 608, male plate 102, Phenolic Sheet (if included), plate distributor 606, and the pyramid-shaped pressure distributor 602 are affixed with the pressing mechanism 106 using any suitable mechanism or technique. As a non-limiting example, a center bolt 704 can be passed through the components and bolted into the cylinder rod (element 604 in FIG. 6) of the pressing mechanism 106 to align and secure the components together.

In one non-limiting example, as a unit, the cylinder pressing mechanism 106 is installed into the frame assembly by laying the top male plate 102 onto the bottom plate 104 and twisting the cylinder of the pressing mechanism 106 to align a two top bolt pattern 612 on the cylinder pressing mechanism 106 through the top 610 of frame. One can then attach and jack up the cylinder rod 604 until the cylinder pressing mechanism 106 is attached to the top 610 of the frame assembly. Then cylinder mechanism 106 can be retracted to lift-up the top plate 102.

To be contrasted with the male plate 102, the female plate 104 includes a recess or hole 614 formed therethrough to receive the male protrusion 608 and direct pressed rosin or other material into the catching area. A heat block 616 (e.g., Teflon or phenolic sheet) can be attached with (e.g., recessed into) a frame plate 618, which can be mounted or otherwise bolted to the frame assembly (e.g., through two bolts that screw from inside the catching area 600. The Teflon or phenolic sheet 616 is included to prevent heat transfer from the female plate 104 to the frame assembly.

Figure 10:
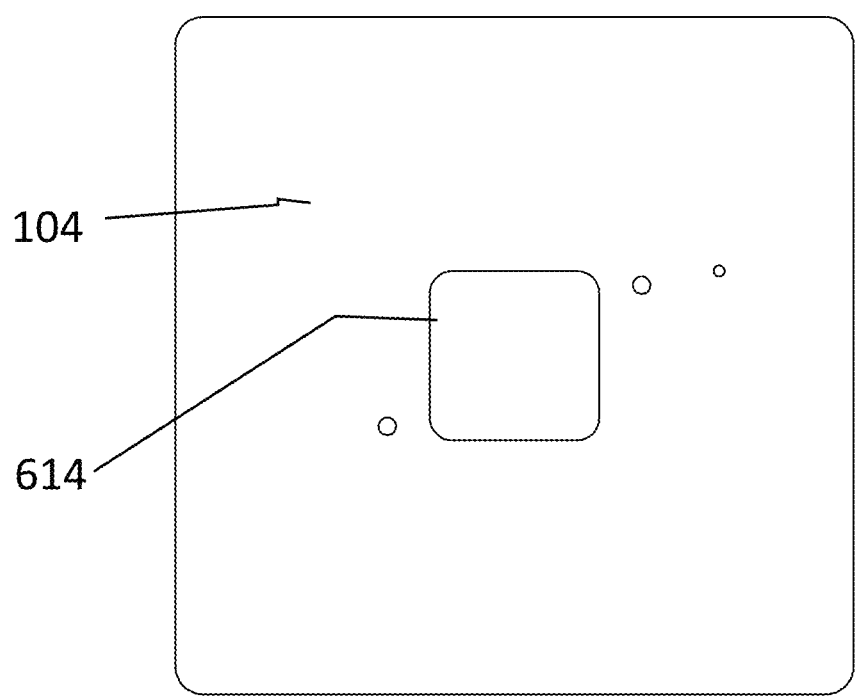
FIG. 10 is a top-view illustration of a female plate according to various embodiments of the present invention.
Figure 11:
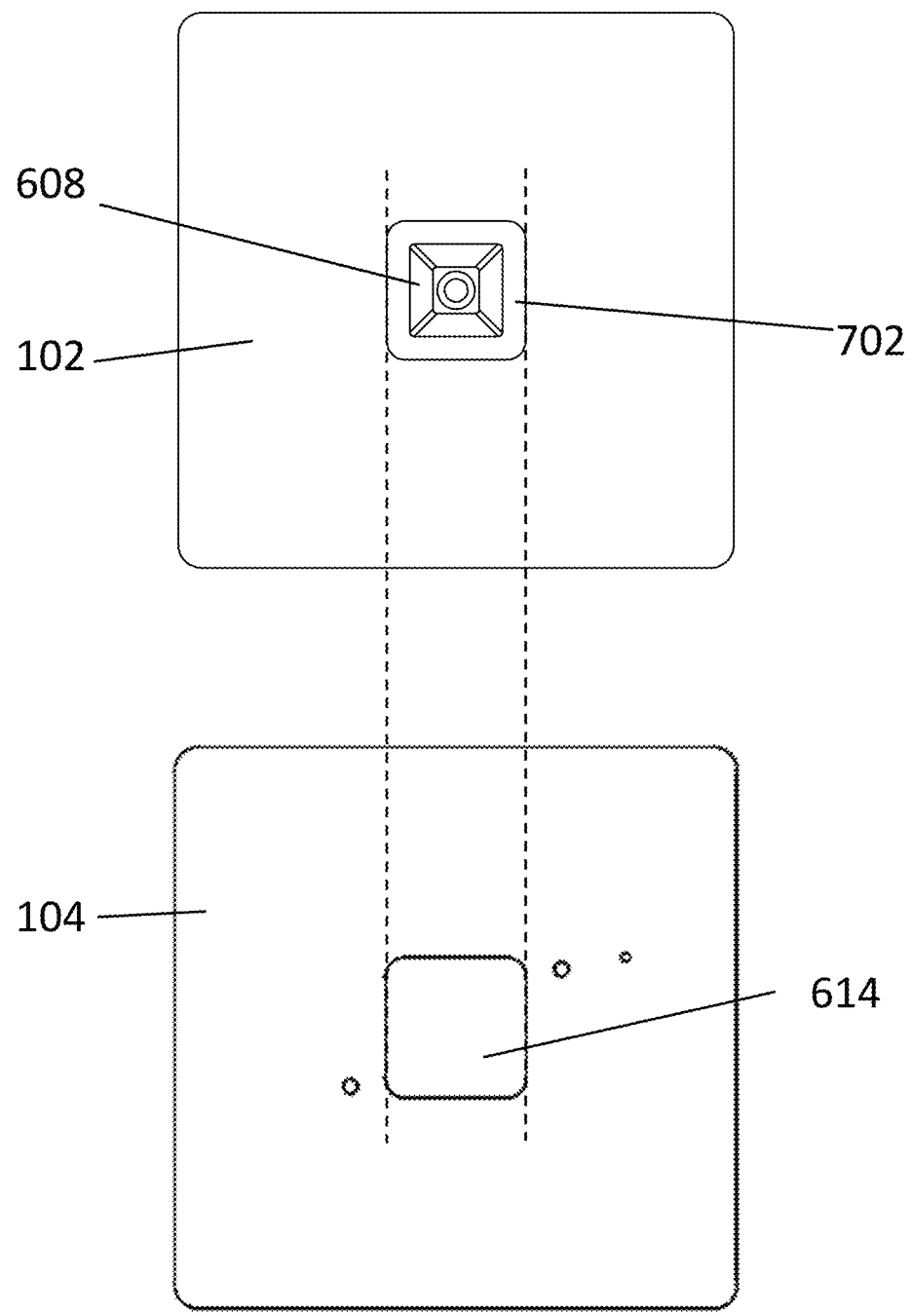
FIG. 11 is a bottom-view illustration of the male plate aligned with a top-view illustration of the female plate.

For further understanding, FIG. 10 provides an illustration of the female plate 104 with the hole 614 therethrough. As shown in FIG. 11, the channel 702 in the top plate 102 is formed such that its dimensions (width, height) are approximately the same as the dimensions of the hole 614 through the bottom plate 104. Thus, oil or rosin pressed between the two plates 102 and 104 is directed downwards by the male protrusion and prevented from collected by the channel 702.

To assist the extract (e.g., rosin, oil, etc.) in being extracted/pressed from the plant material and flowing from the plates 102 and 104, heating elements are desirably included in one or both of the plates 102 and 104. The male 102 and female 104 plates can be formed to include heating elements using any suitable mechanism, device or technique. As a non-limiting example the male 102 and female 104 plates are operated by one or two digital heating controllers for dual heating accuracy of heating elements. A non-limiting example of a digital heating controller includes the MYPIN T series controller as produced by MYPIN Electrical Co., Ltd, located at Floor 1, No. 7, Lane 5, Anhe St., Fengyu Rd., Bogong Community, Dongfeng Town, Zhongshan, Guangdong, China.

Figure 12A:
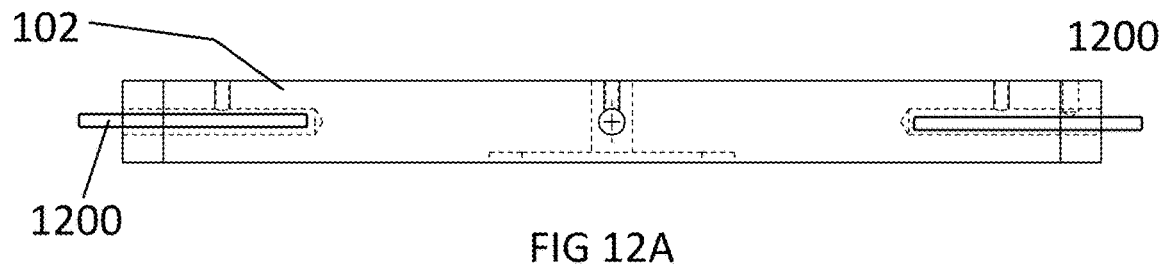
FIG. 12A is a side-view illustration of a plate according to various embodiments of the present invention.

Further, there are desirably multiple heating elements per plate 102 and 104, each of which is connected with the necessary power (e.g., electricity, hardwire, etc.) and circuitry as needed for control. For example and as shown in FIG. 12A, the male plate heating elements 1200 are positioned into holes drilled into the sides of the male plate 102. It should be noted that any suitable number of heating elements 1200 can be included. However, desirably, there are eight elements per plate that allows for an even disbursement of heat across the plates.

Figure 12B:
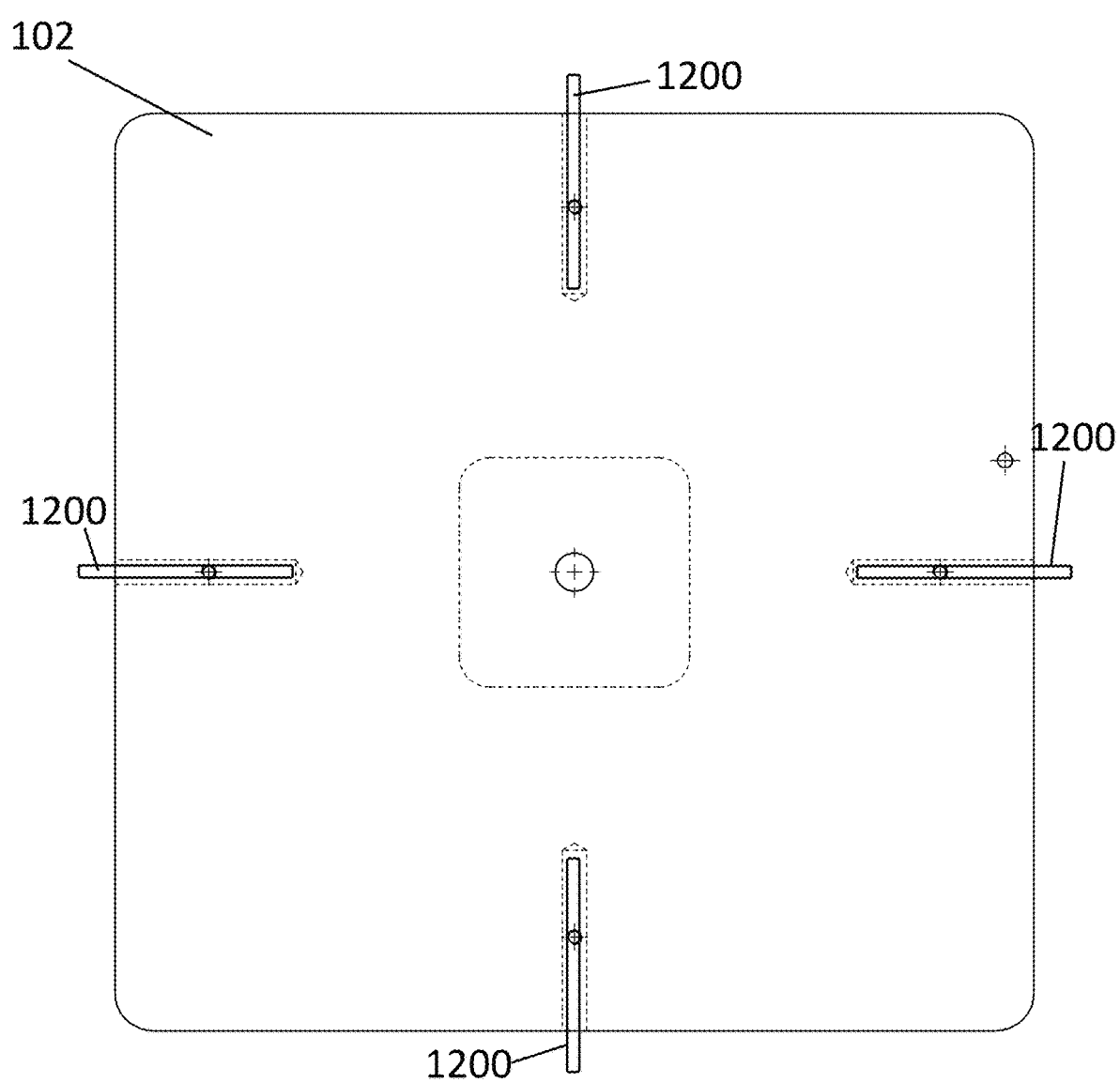
FIG. 12B is a top-view illustration of the plate as depicted ion FIG. 12A according to various embodiments of the present invention.
Figure 13A:
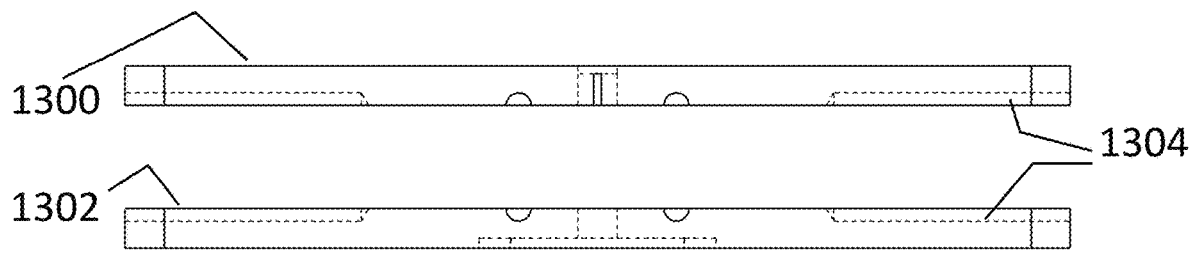
FIG. 13A is a side-view illustration of a plate according to various embodiments of the present invention.
Figure 13B:
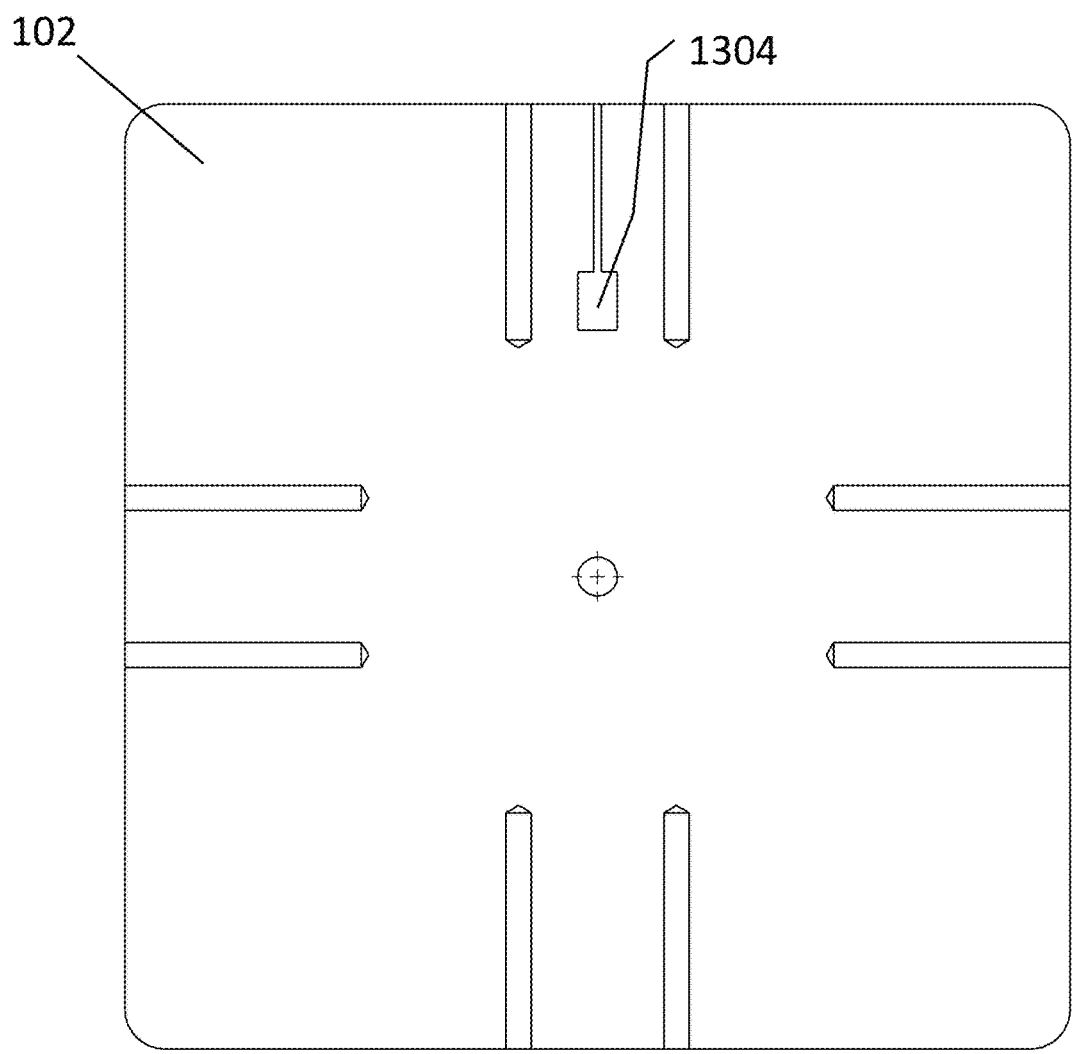
FIG. 13B is a top-view illustration of the plate as depicted ion FIG. 13A according to various embodiments of the present invention.

In another aspect and as shown FIGS. 13A and 13B, instead of holes, the plate can be split into two parts (e.g., halves) 1300 and 1302 to allow for placement of the heating element within grooves 1302 formed within the parts 1300 and 1302. In this aspect, the two parts 1302 and 1304 are then attached together to collectively form the male plate 102. An advantage to this aspect is that there is no gap between the heating element and the metal forming the plate 102, thereby providing a more efficient plate 102. A temperature probe 1304 (e.g., thermometer, etc.) can also be positioned between the heating elements in either configuration to provide for an accurate temperature reading for precise control of the heat to the plates 102 and 104. It should also be noted that although FIGS. 12A through 13B are discussed and illustrated with respect to a male plate 102, the two parts, heating elements and concepts as described and illustrated are equally applicable to the female plate. Thus, with respect to the female plate, the heating elements can be positioned within the plate through holed drilled into the side (as shown in FIGS. 12A and 12B) or through halving and grooves (as shown in FIGS. 13A and 13B) formed in the female plate.

The use of multiple heating elements in each plate assists in maintaining a constant temperature around each plate. The multiple heating elements signal the temperature to the controller (e.g., MYPIN, etc.) through corresponding temperature probes to control the plates 102 and 104 at the desired temperature. The temperature can be set to any desired temperature. As a non-limiting example, it is desirable to have the male plate 102 set between 120 degrees and 240 degrees Fahrenheit and the female plate set between 120 degrees and 240 degrees Fahrenheit, depending on oil type or plant material.

Further, through the addition of heat and as noted above, the heated male 102 and female 104 plates allow the flow of resin/oil to be controlled with gravity directional flow after being separated from plant material from the heat by the plates 102 and 104. In other words, because the female plate 104 is a heated and shaped to receive the male protrusion from the male plate 102, extracted material can easily flow to the centrally positioned drain hole 614.

As noted above and referring again to FIG. 1, the female plate 104 rests atop a collection area 600 which allows for placement of a tray 108 or drawer beneath the female plate 104 for catching all of the draining rosin. Lights can be positioned within the collection area 600 to illuminate the process and collected rosin. For example, the collection area 600 includes two LED daylight strip, which are powered to a switch placed at any suitable location. In another aspect, the lights can be programmed to turn off as an indicator to keep hands clear while operating and illuminating after the press process is completed (or vice versa as desired.

Figure 13C:
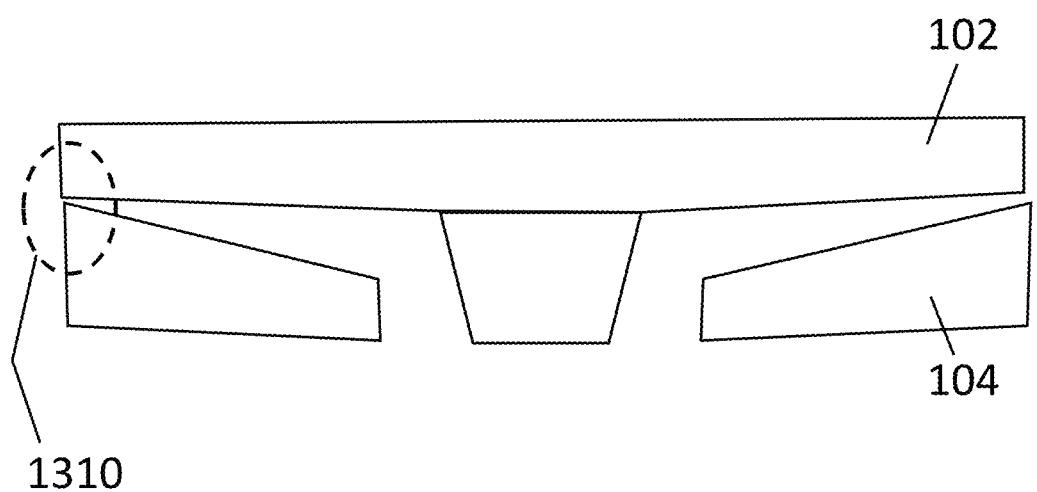
FIG. 13C is a side-view illustration depicting an aspect of the male and female plates according to various embodiments of the present invention.

In one aspect and as shown in FIG. 13C, the bottom side of the male plate 102 is angled with respect to the top side of the bottom plate 104 such that the periphery 1310 of the two plates touch first to squeeze contents toward the middle when they are pressed together. In this aspect, the top side of the bottom plate 104 can also be angled slightly so that the periphery 1310 of the two plates touch first. In other aspects, the plates 102 and 104 are parallel with respect to one another, or any combination thereof. Angling the plates 102 and 104 can be used to assist in the directional flow of the rosin toward the hole 614 in the female plate 104.

Figure 14A:
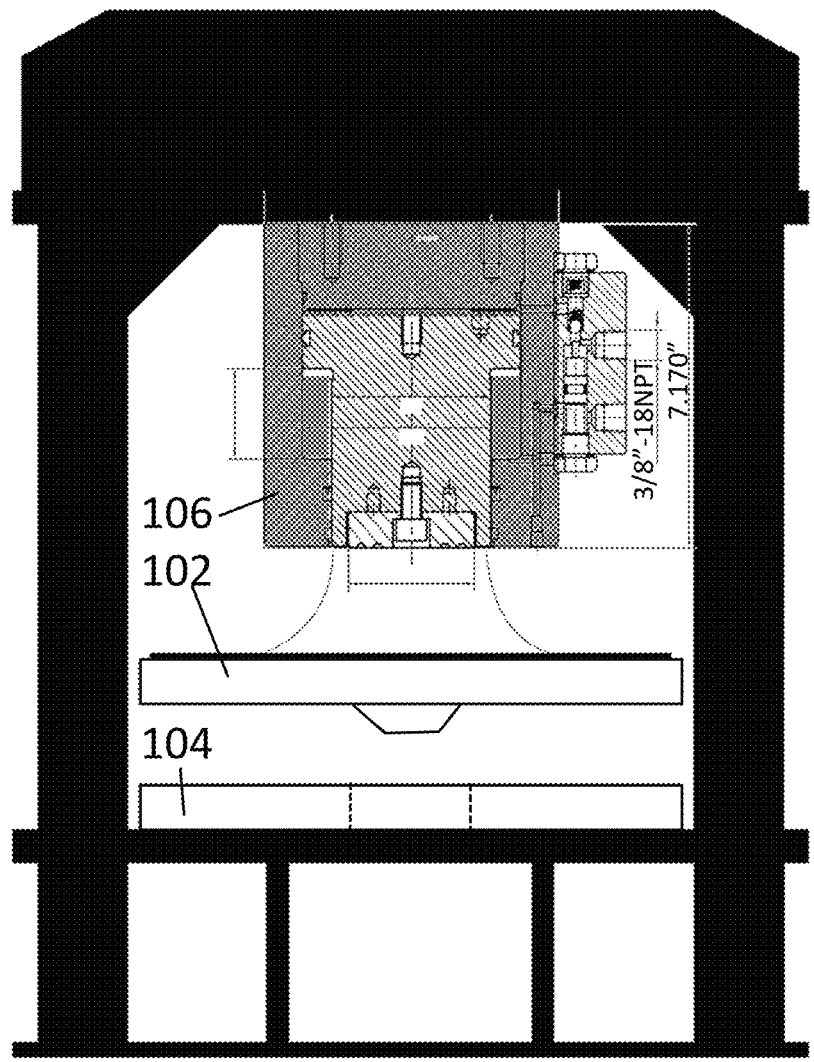
FIG. 14A is a cross-sectional, side-view illustration of the rosin press according to various embodiments of the present invention.
Figure 14B:
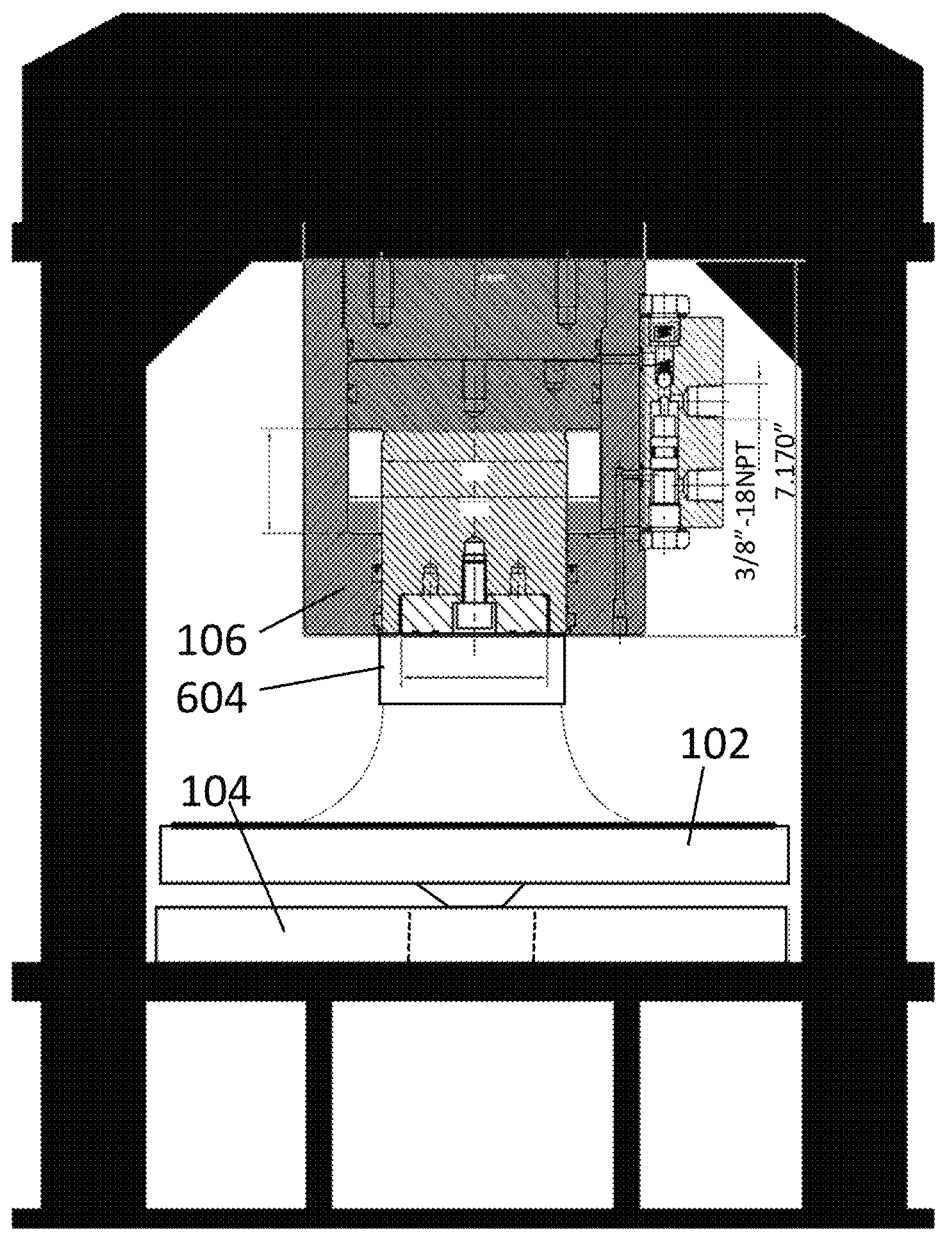
FIG. 14B is a cross-sectional, side-view illustration of the rosin press according to various embodiments of the present invention.
Figure 14C:
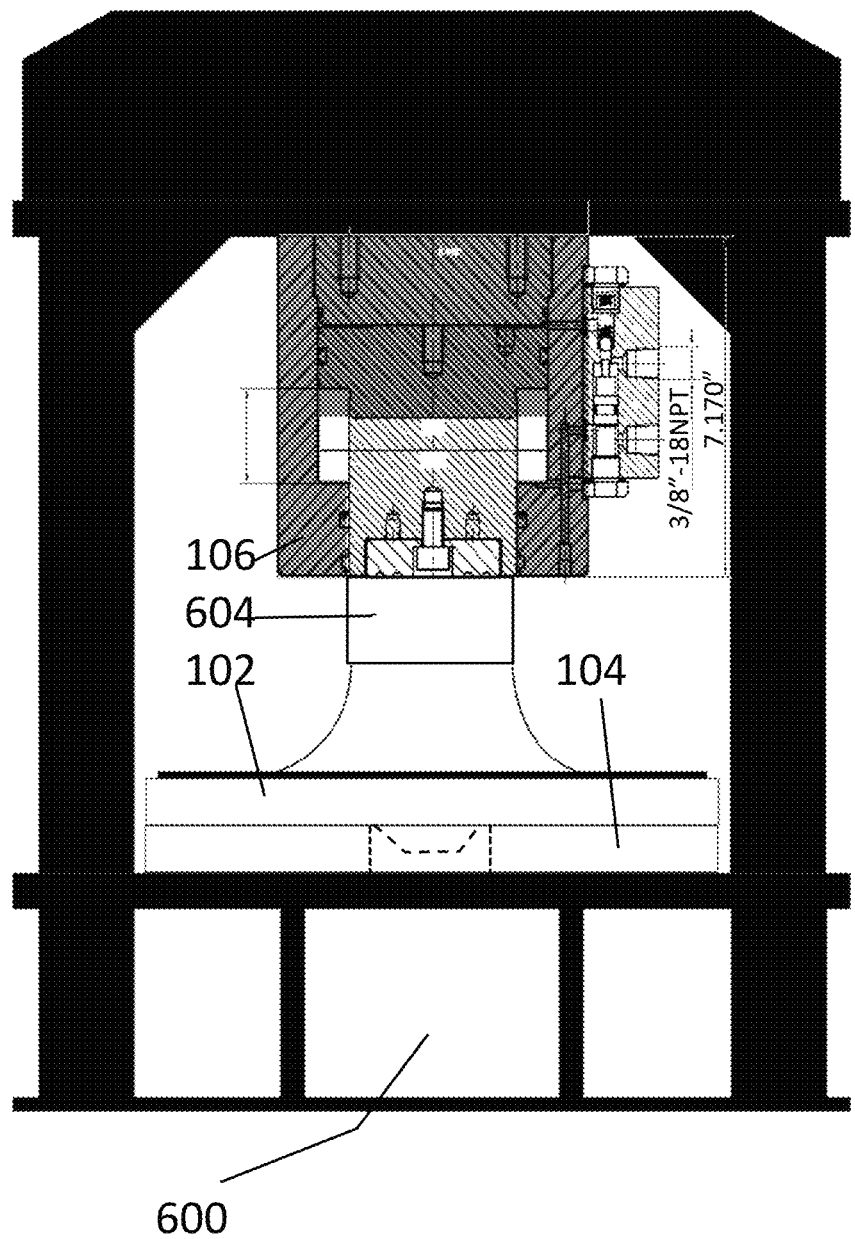
FIG. 14C is a cross-sectional, side-view illustration of the rosin press according to various embodiments of the present invention.

As shown in FIGS. 14A through 14C, as the pressing mechanism 106 is operated, the cylinder 604 (or other related component) is actuated to cause the male plate 102 to press against and nest within the female plate 104. In doing so, rosin or other extract is pressed from plant material and into the collection area 600. As noted above, the pressing mechanism 106 is any suitable mechanism or device that is capable of pressing the plates 102 and 104 against one another with sufficient force to press rosin and other material from plant components place between the plates 102 and 104. Although not depicted, the pressing mechanism includes all of the connectors, hoses, and other components as may be necessary to operate as described and understood by those skilled in the art.

It should be understood that any desired plant material may be placed in between the plates 102 and 104. Desirably, the plant material is compressed into a desired shape that allows for placement within a filter bat. For example and as depicted in FIGS. 15A and 15B, a variety of molds can be included that allows for shaping and compacting the plant material 1500 into a puck or compressed shape.

Figure 15A:
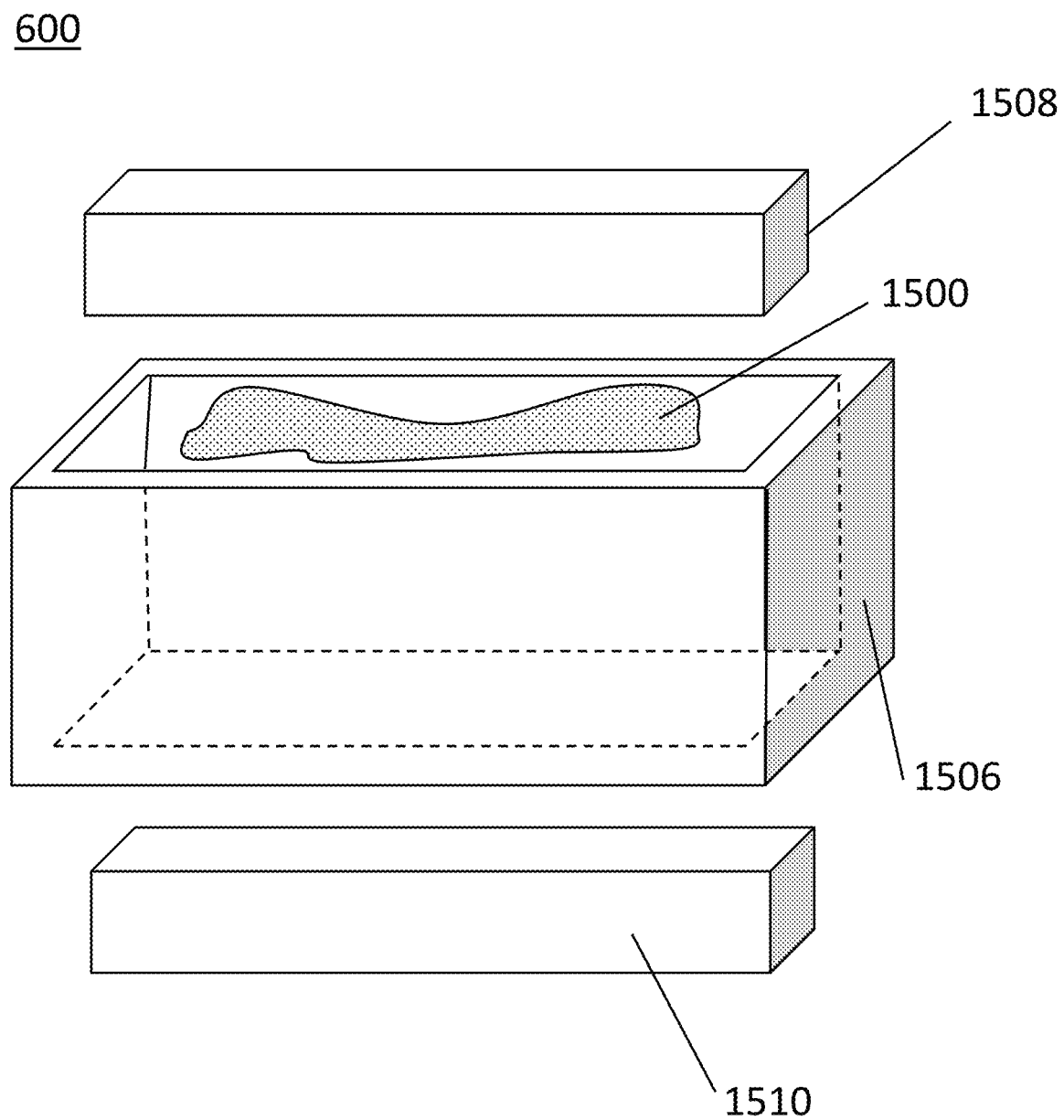
FIG. 15A is an illustration of puck mould designed to be used in conjunction with the rosin press according to various embodiments of the present invention.

A non-limiting example of such a puck mold is illustrated in FIG. 15A. The puck mold includes a frame 1506 and a top press 1508 and bottom press 1510 that are designed to fit within a recess of the frame 1506. During operation, plant material 1500 may be placed within the recess and between the top press 1508 and bottom press 1510. The mold is then placed in the rosin press 10 and between the flat male and female plates. The plant material can then be easily compressed into a brick-like solid piece, otherwise known as a puck, doubling the amount of material to be pressed in a single rosin press. By choosing to compress the plant material prior to heat pressing the puck (i.e., between the plates), the amount of plant material able to be used in the rosin press is dramatically increased (e.g., doubled), thereby cutting down on usage time.

Figure 15B:
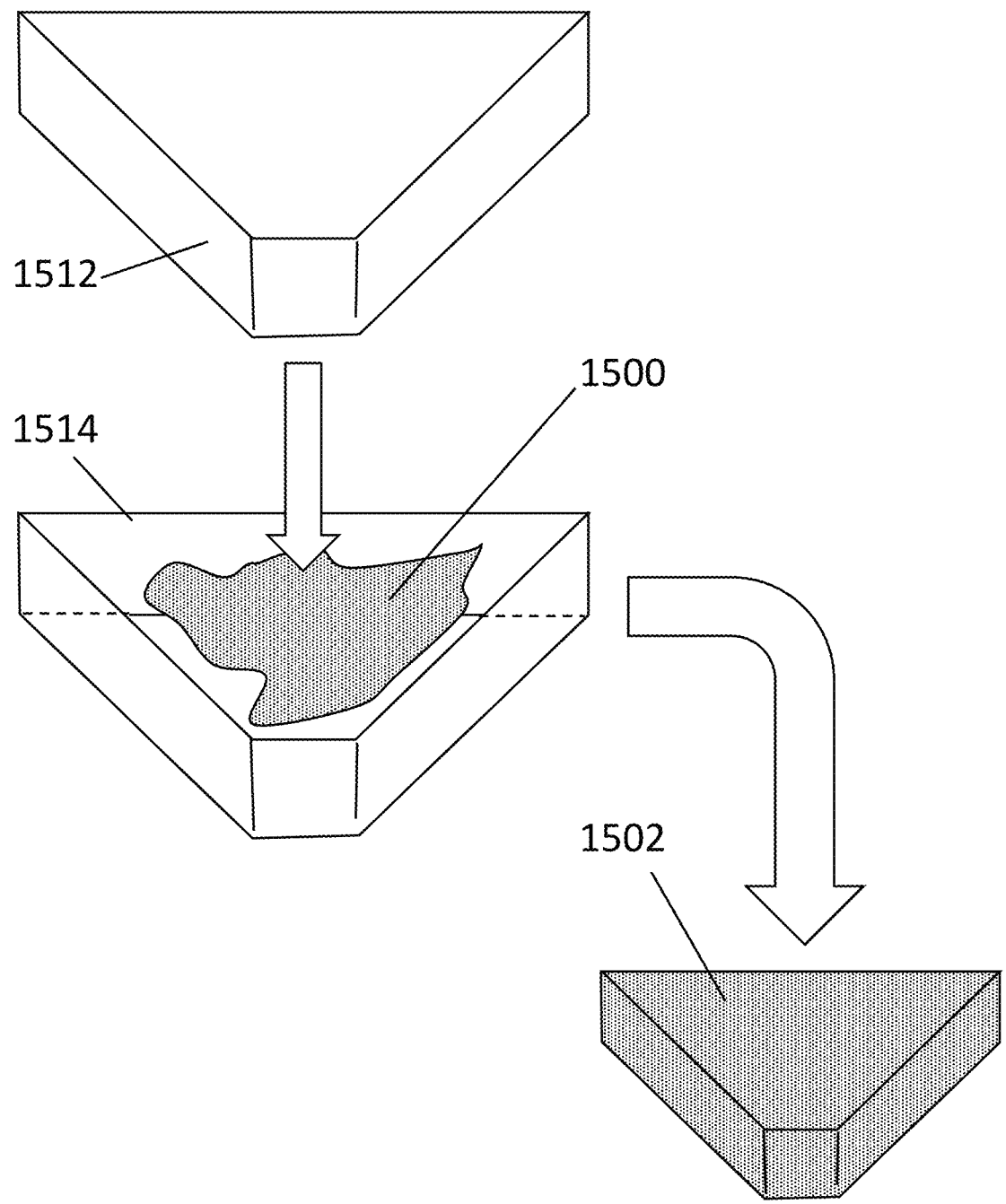
FIG. 15B is an illustration of puck mould designed to be used in conjunction with the rosin press according to various embodiments of the present invention.

Another non-limiting example of a mold is shown in FIG. 15B. In this aspect, the puck mold has a top press 1512 that can be used to compress the plant material 1500 within a frame 1514 and form the puck 1502. Also as show, the mold is formed in any suitable shape to form the resulting puck 1502 in the desired shape. In this aspect, the puck 1502 is trapezoidal to allow the puck to be placed around the hole of the female plate with three other pucks (totaling four pucks in this example.

Figure 16A:
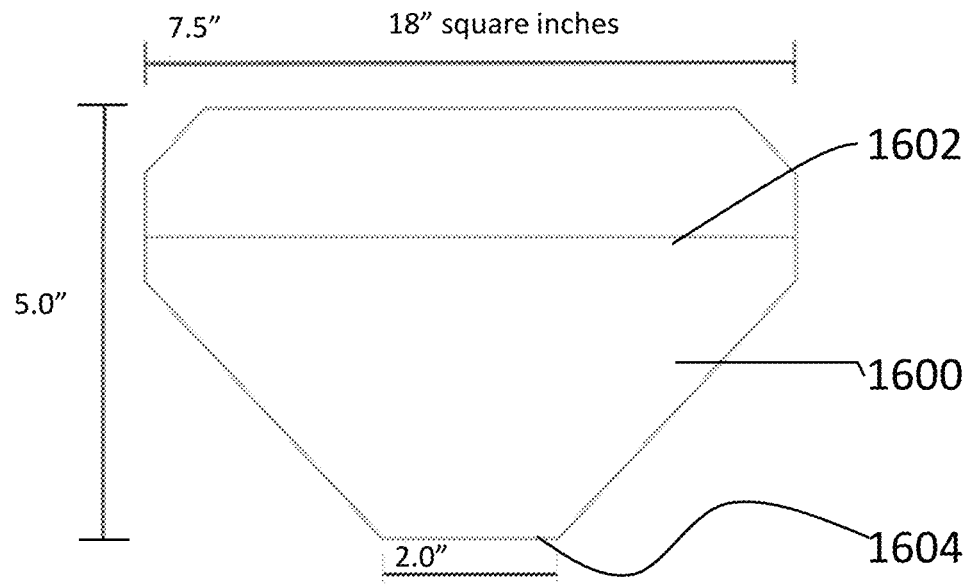
FIG. 16A is an illustration of filter bag designed to be used in conjunction with the rosin press according to various embodiments of the present invention.
Figure 16B:
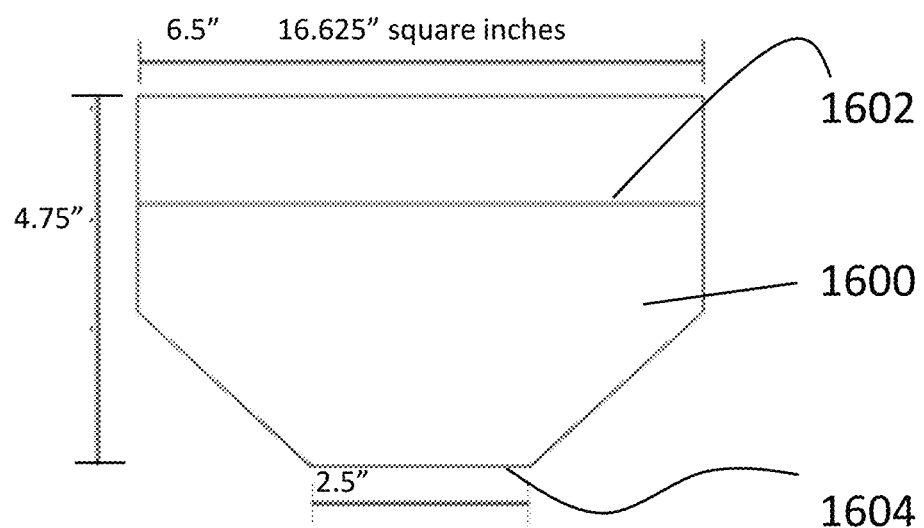
FIG. 16B is an illustration of a filter bag designed to be used in conjunction with the rosin press according to various embodiments of the present invention.

Once formed into the puck shape, the rosin press system desirably includes filter bags. Thus, to assist in pressing the plant material and maintain a clean working surface, the invention described herein also includes parchment cones and mesh filter bags (e.g., micron mesh filter bags). The mesh filter bags are shaped in any desired shape to fit within the rosin press and assist in maintaining the plant material between the heat plates. For example and as shown in FIGS. 16A and 16B, the filter bags 1600 are designed as a truncated cone in order to match the dimensions of the female plate around the hole in the middle of the plate. In other words, the present invention also includes mesh filter bags 1600 that can be positioned around the female plate. For example, due to the truncated cone shape of each mesh bag, four, six or eight bags (or any other desired number depending on the dimensions and shape) can be fit side-by-side on the female plate.

As shown in FIGS. 16A and 16B, in some embodiments, the mesh bags 1600 have an opening at the top 1602 to allow the plant material to be placed inside. In other aspects, an opening can also be formed at the bottom 1604 to allow the rosin to seep more easily from the bottom of the bag 1600. The mesh filter bags 1600 can be made of nylon material or any other desired material, they can be a "V" shaped bag (e.g., 6" tall by 2" wide) in another aspect, and can be formed to have micron holes between 25 microns to 220 microns (or any other desired dimension).

The pyramid shaped micron filter bags 1600 and a unique folded parchment paper technique is mechanically designed to position themselves in the perfect position onto the heating plates as all four bags are perfectly inserted into the machine. This position is important for oil to flow in a controlled manner off of the plates and down the nipple angle. The rosin press is formed as a rosin press system that uses the crafted parchment paper folding technique to assist a commercialized rosin process, which quadruples direction flow by simply folding the unique parchment paper as shown.

Although described with respect to the pyramid shape rosin filter bag, the rosin press can be used with any size/shape rosin bag, with or without using the folding technique.

Figure 17:
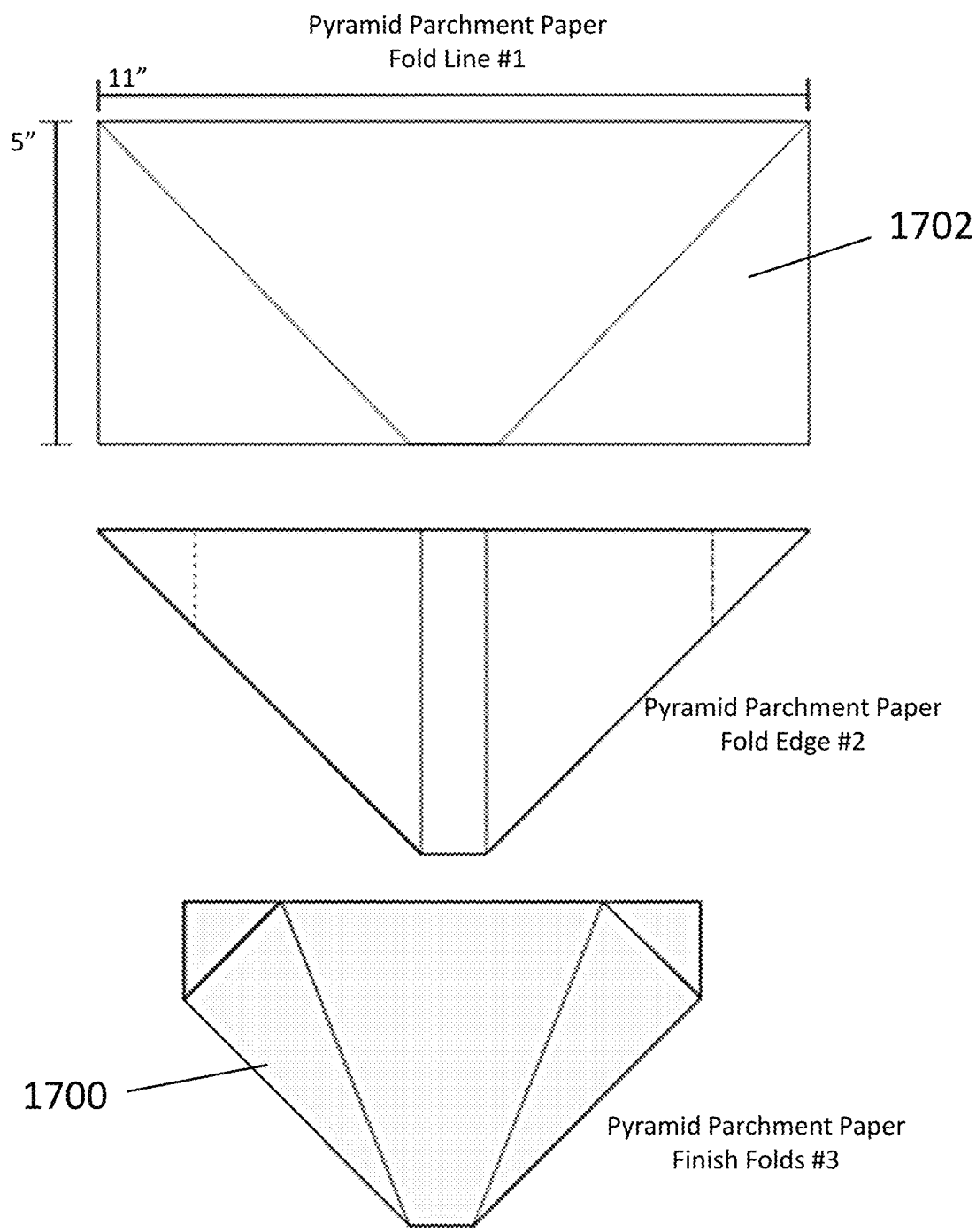
FIG. 17 is an illustration of a process for folding and forming a parchment paper designed to be used in conjunction with the rosin press according to various embodiments of the present invention.

As noted above, the present invention also includes parchment paper. The parchment papers are formed in any suitable manner and of any suitable material to be fit within and/or between the male and female plates to prevent sticking and assist in maintaining a clean press environment. A non-limiting example of such a parchment paper 1700 is seen in FIG. 17. As a non-limiting example, the parchment paper 1700 is depicted as being formed from a flat piece of paper 1702, with desirable dimensions and cut lines, so that the piece of paper 1702 folds into a cone shape and forms the resulting cone-shaped parchment paper 1700. Although specific dimensions and cut lines are depicted, it should be understood that the invention is not intended to be limited thereto.

The parchment paper 1700 can be developed and cut from a piece of standard paper in order to match the dimensions of the male and female plates. In other words, after formed or otherwise cut into such a shape, the paper can be easily rolled or manipulated into a cone-shape or other desired shape, thereby forming the cone-shaped parchment paper 1700.

The parchment paper 1700 can be positioned onto the female plate to allow the rosin to escape onto the parchment paper 1700 and not onto the plates themselves. This allows for less post-use cleaning, as the parchment paper 1700 is removable and replaceable. The parchment paper 1700 can contain a male or female fitting, or can be formed of any suitable material, or be treated with other materials, such as Teflon coated, etc.

Figure 18A:
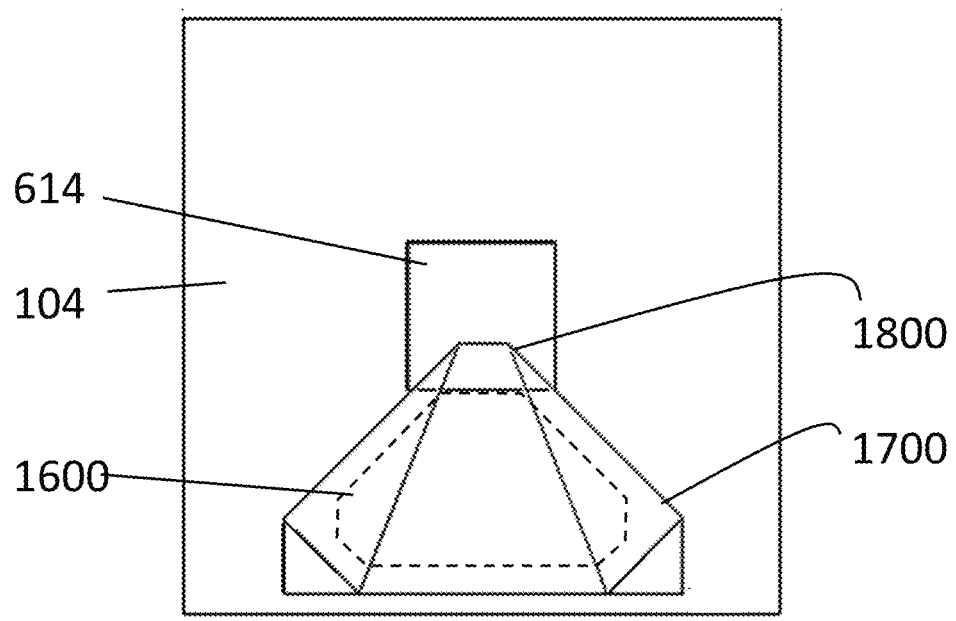
FIG. 18A is an illustration depicting a parchment paper as laid against the female plate according to various embodiments of the present invention.
Figure 18B:
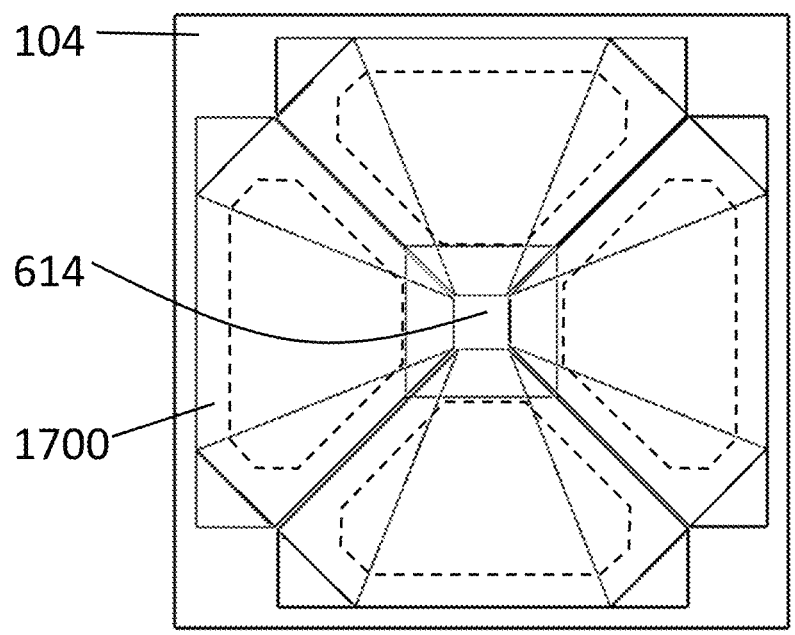
FIG. 18B is an illustration depicting four parchment papers as laid against the female plate according to various embodiments of the present invention.

The placement of the filter bags 1600 and the parchment paper 1700 can be seen in greater detail in the illustrations as depicted in FIGS. 18A and 18B. As shown, the filter bags 1600 (with the pressed puck therein) can be placed within the parchment paper 1700 and laid upon the female plate 104 with tips 1800 of the parchment paper 1700 hanging over the drain hole 614 in the female plate 104. FIG. 18B further illustrates four separate parchment papers 1700 (with bags and pucks therein) laid upon the female plate 104 around the drain hole 614.

The unique parchment paper folding technique is engineered to accomplish two things. First, to control the directional flow of oil by folding three of the four sides leaving the inner side open for oil release. Secondly, to mechanically center and position the inserts perfectly as four of the inserts come together to make a square with a one inch center perimeter and eleven inch perimeter squared which, sits inside of the heating plates perimeter by approximately one half inch.

The importance of positioning the insert into the machine perfectly aligned is critical to avoid blow outs, oil leaks, and/or the filter bag missing the plates. Sensors can be added to ensure positioning. As long as the insert is properly folded when slid into the machine, oil will pour within a one and a half to half inch diameter. Combining the collection of oil to fall almost together creating a "pour" like technique.

When all inserts are together the outer edge layout is designed to lay one half inch from the outer perimeter of the bottom plate so no oil releases to the outside edge the parchment pocket or off the plates to cause a blow-out. All oil is meant to release from the only opening in the parchment for which this opening should be the only opening off of the heat plates. In this case, the oil only travels off the heat plates down a forty five degree angle and pours out of a one inch hole (or other suitable size).

Figure 19A:
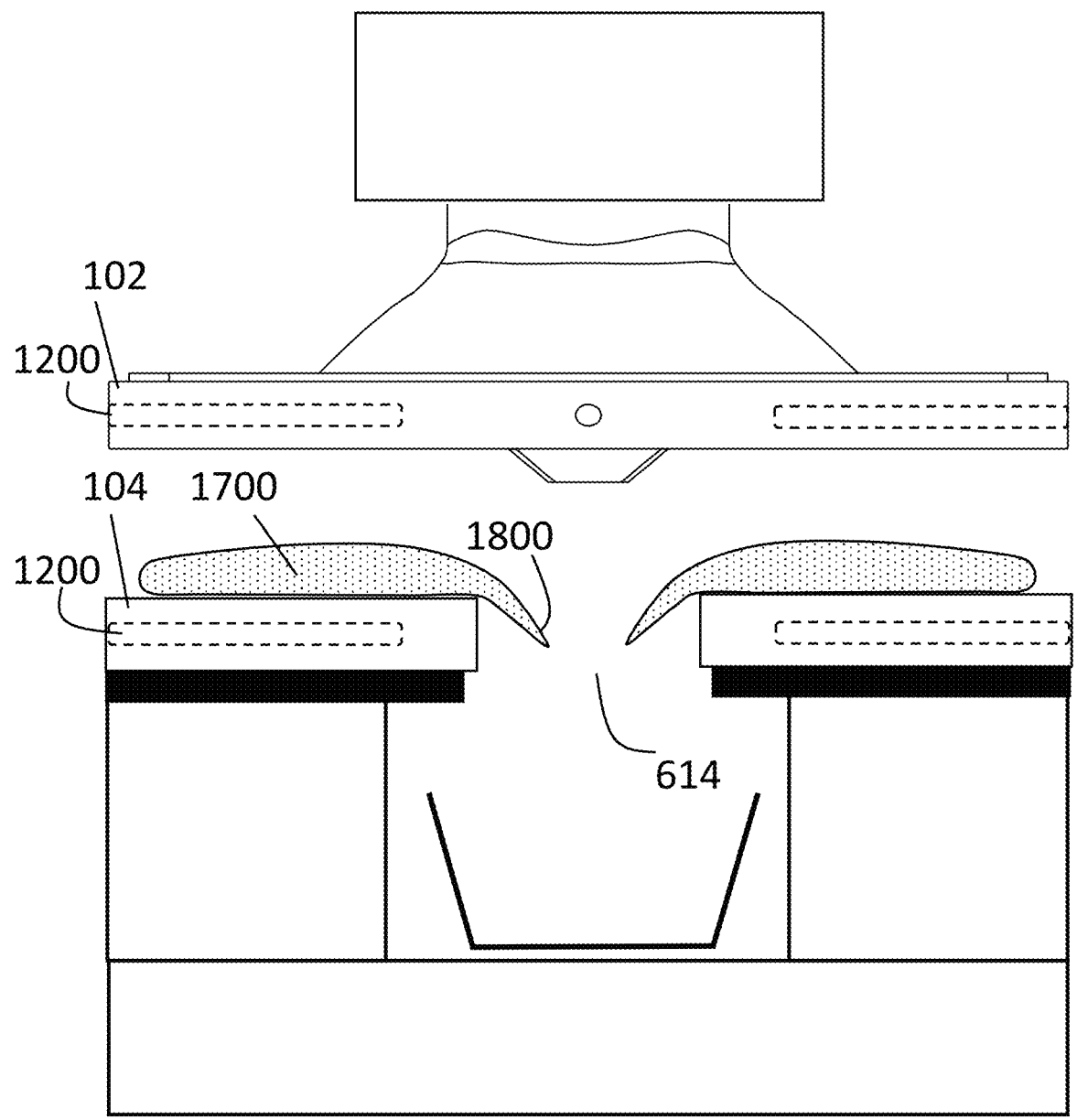
FIG. 19A is a cross-sectional, side-view illustration depicting the parchment papers placed within the rosin press according to various embodiments of the present invention.
Figure 19B:
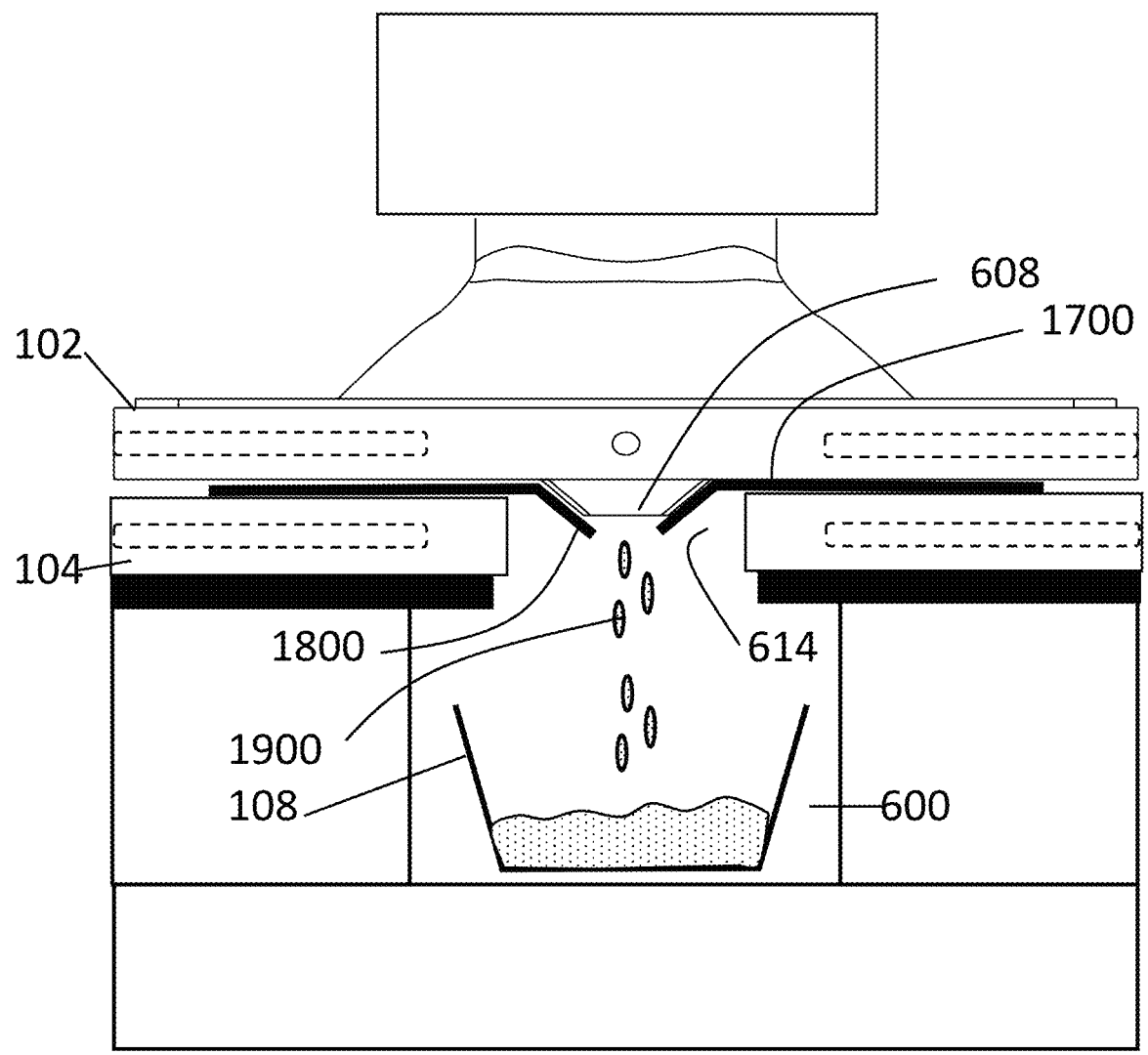
FIG. 19B is a cross-sectional, side-view illustration depicting the parchment papers placed within the rosin press, with rosin being pressed from plant material according to various embodiments of the present invention.

This concept is further illustrated in the cross-sectional views of FIGS. 19A and 19B. As shown, the parchment paper 1700 (with filter bag and pressed puck therein) is placed between the male 102 and female 104 plates such that the tips 1800 of the parchment paper 1700 hangs over the hole 614 within the female plate. Also shown are the heating elements 1200 within each of the male and female plates 102 and 104. As shown in FIG. 19B, as the pressure begins to extract the rosin 1900 from the plant material, the rosin 1900 drips through the drain hole 614 in the bottom of the female plate 104 and into a plate, pan, or other collection item (such as collection tray 108). Once in the cooling collection area 600, the rosin 1900 is naturally cooled and/or can be further cooled via air flow from a fan.

Also as shown, the male protrusion presses the tip 1800 of the parchment paper 1700 into the hole 614 to assist in directing the rosin 1900 into the collection area. The precise control of the heat and pressure allows an operator to press the rosin 1900 from the plant material and even control the degree to which lipids, fats, and terpenes separate.

Each parchment paper 1700 insert requires a unique trapezoid shape micron mesh, nylon silk screen, rosin filter bag. In one aspect, the threads lay 0.125" from edge of the bag, doubled stitched seams for pressure protection. These filter bags are designed to fit a quarter inch thick puck mold of material perfectly into the filter bag. The flap of the filter bat is, for example, one quarter inch longer to provide for the thickness of the puck when enclosed. Before the pucks are inserted, it is recommend to flip the bag inside out to seal the stitched seems for a seamless edged bag. This helps ensure that no oil gets caught onto the mesh. The pyramid-shaped filter bag goes into the parchment paper and is positioned between one quarter inch to one half an inch from the long width of the back folded parchment paper. This helps ensure that the tip of the bag is close to one half inch to one inch from the edge of the heating plates. The closer the bag is to the edge, where oil is to release, the faster the oil starts to pour out. Going over the edge will cause the bag to act as a net, catching oil and leaving portions of the bag that will not be extracted.

When separating oil from plant material using heat and pressure, the heat is used to liquefy the oil content while the pressure is used to move the oil from the plant material, separating through a micron mesh filter screen, then onto the parchment paper to finally fall into the collection area.

As noted above, the micron mesh filter bag or rosin filtration bag comes in different shapes and sizes, both micron (um) and dimensions. This is important depending on the type of content that is being separated by the press. The trichrome oil which comes from a *cannabis* plant uses a variety of different sizes, which means that one might use a different micron mesh filter bag/screen to filter the separated oil as a liquid, such as terpenes or as a butter or crumble.

A good technique of using this machine is matching the material with a micron size with temperature. Different oil-based content requires different temperatures to extract at different rates of flow, plus multiple oil components such as lipids, fats, and terpenes. In addition, the age or oxidization of the material being extracted will require different temperatures ranges used as well. For example, a 160 micron filter bag, pressed at 208 degrees and 2300 psi, will extract lipids and fats first, then followed by the terpenes, separating the two components from each other in a single press because of the need to move the puddle as the oil flows. A couple factors allow this to happen.

First, the plant material covers approximately 90%-99% of the parchment paper insert, so the oil can move faster when separating from the plant material, through the filter bag screen, and falling off the parchment paper to preserve color and flavor (Terpenes or Terps). This is where the coverage of plant material versus surface area is important so that when the oil passes out of a filter bag or screen, the puck becomes a wall where the parchment paper is the tunnel and oil moves faster with a perfectly fit bag and parchment paper. Therefore, more coverage equals more compression, which means faster oil movement. Adequate pressure (e.g., being over 2000 psi) makes the filter bag turn into a dried puck, not a sponge. Second, the unique designed combination of heating plates, trapezoid or pyramid-shaped filter bag, and parchment paper folded technique allows for the a pouring flow of oil. This gives the user control of the oil as it falls from the heat plats.

The fact that four bags sit squared and perpendicular to create a center pour option from the design of these heating plates under a targeted precisely controlled temperature of 110 degree to 212 degree, from both top and bottom plates, is prime means of the separation between lipids and fats (waxes or crumble) and terpenes (Essential oil). As noted above, adequate pressure above 2,000 psi of force, pressing against the plant material surface area is targeted with a 100 ton cylinder (1 ton-2000 ton+) to move the oil fast enough to fully extract the bag to achieve a near dry puck (plant material), which is proven with higher percentage returns because more pressure is calculated than standard rosin presses where they have to do multiple presses. Overall, this calculation and build of a rosin press gains more yield per press, which also preserves color, flavors, and overall quality of extracted oils and fats. In addition, the rosin press collection area is another key component to the separation process of lipids and fats from terpenes because the control one has of the oil as it falls from the plates, which allows the user to pull or move the collection tray (jar or silicone non-stick container or paper) forward once the detected the lipids and fats have fallen. The indicator is normally a notice of color change from light yellow to brown or darker yellow. It was discovered that lipids and fats are separated first (tested at 208-210 degree) or move faster off the plant material, through the filter bag, and off the parchment paper, before the terpenes.

An optional secondary step to extracting the essential oils is by filtering the terpenes through a finer mesh filter bag, such as 5 um-25 um, at a higher heat, to separate the terpene oil (liquid part) by leaving the thc-a behind in the rosin bag.

The present invention provides a better process than the current method of extraction, such as a solvent form like butane, alcohol, co2, ethanol or any other solvent, where a winterized stage is done to freeze the lipids and fats from the essential oils. In the prior art, existing presses are not able to separate the distinct components because there is no control of the oil (i.e., the terpenes pass the lipids and fats and the components are mixed).

In the present invention, the rosin press can be used to separate the lipids and fats from the terpenes in two differ containers (e.g., collection trays such as petri dishes). For example, this can be done by stacking the petri dishes and lifting the plates to slow or stop the oil flow when it is visually noticed that it is time based on the distinct content being pressed out. Then, the temperature can be increased while pulling the top dish off. The increased temperatures and increased pressure finished the press off by fully extracting the remaining (stickier) oil left in the puck. Again, seeing the lipids and fats extract first from the plant material at a lower temperature.

As can be appreciated by those skilled in the art, there are several additional features included in the rosin press 100 that are described herein. In various embodiments, the rosin press 100 includes all of the relevant hardware and/or components as may be necessary to implement the features and functions as described herein. Further, while specific examples are provided, it should be understood that the invention is not limited thereto and that other components can be used to provide similar functionality as understood by those skilled in the art. For example and n various embodiments, all components of the rosin press 100 can be formed to fit within a transportable storage container with wheels, etc. Further, various embodiments of the rosin press 100 include hydraulic quick connect lines to allow a user to easily attach/detach the hydraulic lines.

As can be appreciated by those skilled in the art, additional features can be added to this invention. For example, the heating element and the plates can be altered a number of ways. The plates can be manufactured to contain grooves to lock in the bags during pressing. The grooves would assist in controlling the directional flow of the oil as its extracted. Gutter runs can also be included that run toward the bottom of each plate for the oil to fall into for a faster escape route. The plates themselves can be larger or have a steeper angle, and the angle of the male and female plates can be matching or be changed with respect to one another In yet other aspects, the heating elements can be placed in different locations and be altered in number or design.

Further, in another aspect, the PID's are wired to the heating elements which are activated when a set temperature is reached. This machine, in one aspect, uses four heating elements for each of the male and female plates 102 and 104. In another aspect and as described above, eight heating elements are placed in each of the male and female plates 102 and 104. In one aspect, the heating elements are placed in the centers of the plates where each rosin filter bag is placed for when the heating elements activate and the machine is pressing at the same time so that the oil is directed away from the hottest spot which would lead to the oil leaving the plant material faster. In one aspect, the unique heating plates are squared at twelve inches per side. In another aspect, the male plate house a male protrusion that has a two inch square bottom trapezoid that is half an inch tall with a one inch top nipple for directing the tip of the trapezoid folded parchment paper downward, thereby creating a pouring affect. When fully compressed, the top heat male plate meets the bottom heated female plate which houses a center hole (three inches across) which gives enough clearance from oil touching any metal or bottom plate hole. In one aspect, together, the plates minimal capacity is two parchment paper inserts and maximum capacity is four parchment paper inserts.

As can be appreciated, additional further modifications can be made. For example, the rosin press can include larger plates or cylinders or leverage mechanics, or multiple plates stacked vertically. For example, stacking plates includes adding heating plates to compress more product out of a center hole running through the plates.

In yet another aspect, the press can be formed to include a human to machine interface (HMI) version to automate the "recipe" of heat and pressure to match the thickness and density of the context of oil. The HMI is basically a programming system that allows for a variety of heat and pressure programs. This can also be used to allow an operator to change the bag size, quantity of bags, and micron size in the filter bag, which makes the movement of the speed of oil a variable. The programs will very between different variables, including time, pressure, and temperatures depending on the content placed between the plates. In other words, the press can be computer controlled to allow for a variety of pressing programs depending on the user and desire. In another aspect, the system can be programmed by the user or simply set to turn on or turn off, etc.

It should be noted that specifics described herein are example embodiments, however, the invention is not intended to be limited thereto. It should also be noted that the rosin press as described and illustrated can be modified to incorporated any of the aspects or components as described in U.S. Non-provisional Ser. No. 15/917,214 as desired to allow the rosin press of the present application to operate as desired.

Thus, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A rosin press system, comprising:
a frame assembly;
a pressing mechanism attached to the frame assembly;
a male plate attached to the pressing mechanism, the male plate having a bottom side press surface;
a male protrusion attached to the male plate such that the male protrusion projects beyond the bottom side press surface of the male plate;
a recessed channel formed within the bottom side press surface of the male plate such that the recessed channel surrounds the male protrusion;
a female plate having a hole formed therethrough to accommodate the male protrusion;
wherein when the male plate is pressed against the female plate, the male protrusion passes into the hole of the female plate; and
wherein the hole has hole dimensions and wherein the channel formed in the male plate has channel dimensions that are substantially the same as the hole dimensions, such that when the male plate is pressed against the female plate with the male protrusion passing into the hole of the female plate, the recessed channel is unobstructed by the female plate.

2. The rosin press system as set forth in claim 1, wherein each of the male plate and female plate are heated with one or more heating elements.

3. The rosin press system as set forth in claim 2, wherein each of the male plate and the female plate are split into two parts, with grooves formed therebetween for placement of the heating elements such that the two parts of each of the male plate and the female plate sandwich the heating elements within each of the male plate and the female plate.

4. The rosin press system as set forth in claim 3, wherein the one or more heating elements of each of the male plate and the female plate include at least eight heating elements positioned around the male protrusion and the hole, respectively.

5. The rosin press system as set forth in claim 4, wherein the hole is a centrally positioned drain hole.

6. The rosin press system as set forth in claim 5, wherein the male projection is a trapezoidal-shaped pyramid.

7. The rosin press system as set forth in claim 6, further comprising a pressure distributor connected between the pressing mechanism and the male plate.

8. The rosin press system as set forth in claim 7, further comprising a pressure plate connected between the pressure distributor and the male plate, such that pressure from the pressing mechanism is distributed to the pressure plate and, thereafter, to the male plate.

9. The rosin press system as set forth in claim 8, wherein the frame assembly includes a frame plate suspended above a collection area, and further comprising a heat block attached with the frame plate, and wherein the female plate is attached with the heat block to reduce heat transfer between the female plate to the frame assembly.

10. The rosin press system as set forth in claim 9, further comprising one or more parchment papers, each of the one or more parchment papers having a parchment tip.

11. The rosin press system as set forth in claim 10, further comprising a mesh filter bag, the mesh bag having a truncated cone shape.

12. The rosin press system as set forth in claim 11, wherein the one or more parchment papers includes four parchment papers, such that the four parchment papers is sized and shaped such that the four parchment papers can be positioned on the female plate to surround the hole, with the parchment tip of each of the four parchment papers being directed into the hole.

13. The rosin press system as set forth in claim 1, wherein each of the male plate and the female plate are split into two parts, with grooves formed therebetween for placement of heating elements such that the two parts of each of the male plate and the female plate sandwich the heating elements within each of the male plate and the female plate.

14. The rosin press system as set forth in claim 1, wherein the hole is a centrally positioned drain hole.

15. The rosin press system as set forth in claim 1, wherein the male projection is a trapezoidal-shaped pyramid.

16. The rosin press system as set forth in claim 1, further comprising a pressure distributor connected between the pressing mechanism and the male plate.

17. The rosin press system as set forth in claim 16, further comprising a pressure plate connected between the pressure distributor and the male plate, such that pressure from the pressing mechanism is distributed to the pressure plate and, thereafter, to the male plate.

18. The rosin press system as set forth in claim 1, further comprising four parchment papers, each of the four parchment papers having a parchment tip, such that each of the four parchment papers is sized and shaped such that the four parchment papers can be positioned on the female plate to surround the recess, with the parchment tip of each of the four parchment papers being directed into the hole.

* * * * *